US012579891B2

(12) United States Patent
Kadotani et al.

(10) Patent No.: US 12,579,891 B2
(45) Date of Patent: Mar. 17, 2026

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Naotoshi Kadotani, Mishima (JP); Yuki Nishikawa, Numazu (JP); Yuki Takahashi, Shizuoka-ken (JP); Nana Kikuire, Shizuoka-ken (JP); Takahiko Kuwabara, Yokohama (JP); Ryusei Gichu, Tokyo (JP); Takashi Ota, Tokyo (JP); Toshifumi Iwase, Tokyo (JP); Hironori Ito, Tokyo (JP); Hisanobu Inoue, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/535,397

(22) Filed: Dec. 11, 2023

(65) Prior Publication Data

US 2024/0265807 A1 Aug. 8, 2024

(30) Foreign Application Priority Data

Feb. 3, 2023 (JP) ................................. 2023-015233

(51) Int. Cl.
| | |
|---|---|
| *G08G 1/133* | (2006.01) |
| *B60W 40/08* | (2012.01) |
| *B60W 50/14* | (2020.01) |
| *B60W 50/16* | (2020.01) |

(Continued)

(52) U.S. Cl.
CPC ............. *G08G 1/133* (2013.01); *B60W 40/08* (2013.01); *B60W 50/16* (2013.01); *G06Q 10/40* (2026.01); *B60W 2050/143* (2013.01); *B60W 2050/146* (2013.01); *B60W 2540/043* (2020.02)

(58) Field of Classification Search
None
See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |

(Continued)

FOREIGN PATENT DOCUMENTS

| | | |
|---|---|---|
| JP | 2005-037182 A | 2/2005 |
| JP | 2008-281521 A | 11/2008 |

(Continued)

*Primary Examiner* — Thomas S McCormack
(74) *Attorney, Agent, or Firm* — Sughrue Mion, PLLC

(57) ABSTRACT

An information processing device includes a movement route receiving unit, an operation-related information acquiring unit, and a display control unit. The movement route receiving unit configured to receive, from an outside, a movement route of a passenger of a vehicle that includes transfer from the vehicle to a scheduled transportation system. The operation-related information acquiring unit configured to acquire operation-related information of the scheduled transportation system to which the passenger is expected to transfer. The display control unit configured to display the operation-related information on a display screen disposed in a cabin of the vehicle.

10 Claims, 16 Drawing Sheets

(51) Int. Cl.
    *G06Q 10/40*        (2026.01)
    *G06Q 50/00*        (2024.01)

(56)            References Cited

U.S. PATENT DOCUMENTS

| | | |
|---|---|---|
| 10,452,930 B2 | 10/2019 | Sato |
| 10,663,973 B2 | 5/2020 | Hashimoto et al. |
| 10,895,875 B2 | 1/2021 | Hashimoto et al. |
| 11,001,198 B2 | 5/2021 | Morimura et al. |
| 11,275,382 B2 | 3/2022 | Hashimoto et al. |
| 2002/0065711 A1* | 5/2002 | Fujisawa ............... H04W 4/024 |
| | | 705/13 |
| 2005/0071080 A1* | 3/2005 | Sano ................. G08G 1/096822 |
| | | 701/428 |
| 2019/0080264 A1 | 3/2019 | Wasekura |
| 2020/0326200 A1* | 10/2020 | Mizoguchi ......... G01C 21/3676 |
| 2021/0041253 A1* | 2/2021 | Walpuck .................. G08G 1/09 |
| 2021/0099439 A1* | 4/2021 | Hassani ................. G06Q 10/02 |
| 2021/0229598 A1 | 7/2021 | Morimura et al. |
| 2021/0380124 A1 | 12/2021 | Urano et al. |
| 2023/0164530 A1* | 5/2023 | Tessler .................... H04W 4/80 |
| | | 455/41.3 |

FOREIGN PATENT DOCUMENTS

| | | |
|---|---|---|
| JP | 2009-222600 A | 10/2009 |
| JP | 2011-227550 A | 11/2011 |
| JP | 2016-013737 A | 1/2016 |
| JP | 2016-162433 A | 9/2016 |
| JP | 2016-197128 A | 11/2016 |
| JP | 2019-053344 A | 4/2019 |
| JP | 2020-113174 A | 7/2020 |
| JP | 2022-037018 A | 3/2022 |
| JP | 2022-160330 A | 10/2022 |

* cited by examiner

INPUT PROCEDURE ON TERMINAL

DISPLAY INPUT SCREEN —A1

INPUT DEPARTURE POINT —A2

INPUT DEPARTURE TIME —A3

INPUT DESTINATION —A4

INPUT ARRIVAL TIME —A5

MAKE MOVEMENT ROUTE SEARCH REQUEST —A6

ROUTE SELECTION PROCEDURE ON TERMINAL

DISPLAY SEARCH RESULTS —B1

SELECT DESIRED ROUTE —B2

DISPATCH RESERVATION PROCESS —B3

TRANSMISSION PROCESS —B4

DISPLAY PROCESS

ESTIMATE PERIOD TO ARRIVAL — 200

ESTIMATE ARRIVAL TIME — 201

MAKE REQUEST TO PROVIDE
OPERATION-RELATED
INFORMATION OF TRAIN
EXPECTED FOR TRANSFER — 202

RECEIVED? — 203
NO

YES

ACQUIRE AND STORE
DEPARTURE TIME ETC. — 204

CALCULATE TIME
DIFFERENCES — 205

DISPLAY ON DISPLAY SCREEN — 206

TO STEP 101

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2023-015233 filed on Feb. 3, 2023, incorporated herein by reference in its entirety.

BACKGROUND

1. Technical Field

The present disclosure relates to an information processing device, an information processing method, and a storage medium.

2. Description of Related Art

There is known an information processing device that searches for a reference route from a departure point to a destination and a service line that serves as an alternative route in a part of the reference route in response to a route search request including the departure point and the destination, and clearly displays, for example, a time difference between a departure time on the service line of the reference route and a departure time on the service line of the alternative route on a display screen of a terminal such as a personal computer or a mobile phone (see, for example, Japanese Unexamined Patent Application Publication No. 2016-197128 (JP 2016-197128 A)). In addition, a multimodal route search technology for searching for a route by combining a plurality of transportation means has become widespread.

SUMMARY

It is assumed that a user performs a multimodal route search using a mobile terminal or the like and obtains a search result showing a movement route on which the user takes a taxi for a railroad station and then transfers to a train at the railroad station. In this case, a travel route from a departure point to an arrival point of the taxi has been displayed on a display screen disposed in the taxi in related art. However, operation information such as a departure time of the train expected for transfer is not displayed. When the passenger of the vehicle wants to obtain the operation information of the train expected for transfer, the passenger of the vehicle needs to check the operation information of the train expected for transfer by using the mobile terminal or the like. Therefore, there is a problem of low convenience.

In view of the above, the present disclosure provides the following information processing device. An information processing device mounted on a vehicle includes:

- a movement route receiving unit configured to receive, from an outside, a movement route of a passenger of the vehicle that involves transfer from the vehicle to a scheduled transportation system;
- an operation-related information acquiring unit configured to acquire operation-related information of the scheduled transportation system to which the passenger is expected to transfer; and
- a display control unit configured to display the operation-related information on a display screen disposed in a cabin of the vehicle.

Further, the present disclosure provides the following information processing method. An information processing method to be performed in a vehicle includes:

- receiving, from an outside, a movement route of a passenger of the vehicle that involves transfer from the vehicle to a scheduled transportation system;
- acquiring operation-related information of the scheduled transportation system to which the passenger is expected to transfer; and
- displaying the operation-related information on a display screen disposed in a cabin of the vehicle.

Further, the present disclosure provides the following storage medium. A storage medium storing instructions that are executable in a vehicle and that cause a computer to perform functions including:

- receiving, from an outside, a movement route of a passenger of the vehicle that involves transfer from the vehicle to a scheduled transportation system;
- acquiring operation-related information of the scheduled transportation system to which the passenger is expected to transfer; and
- displaying the operation-related information on a display screen disposed in a cabin of the vehicle.

Convenience can be improved because the operation-related information of the transportation system expected for transfer can be acquired from the display screen in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When a person moves to a destination, a plurality of movement routes to the destination is generally present, and one movement route is selected from among these movement routes. In this case, the person may select, as the movement route, a movement route using a plurality of different types of moving body, such as a movement route including transfer from a vehicle to a scheduled transportation system. The present disclosure relates to an information processing technology for providing the person who moves in such a case with operation-related information of the transportation system expected for transfer on a display screen mounted in the vehicle. In this case, a manual driving vehicle, an autonomous vehicle, a private car, a commercial vehicle including a taxi, etc. correspond to vehicles to which the present disclosure is applied, and a railroad service such as a train, a monorail, a bus, and an airplane correspond to scheduled transportation systems to which the present disclosure is applied. In the following, the present disclosure will be described taking an exemplary case where the vehicle is an autonomous taxi and the scheduled transportation system is a railroad service such as a train. The present disclosure is also applicable to a manual driving vehicle, an autonomous vehicle, a private car, a commercial vehicle including a taxi, etc. other than the autonomous taxi, and to a monorail, a bus, and an airplane other than the railroad service.

Figure 1:
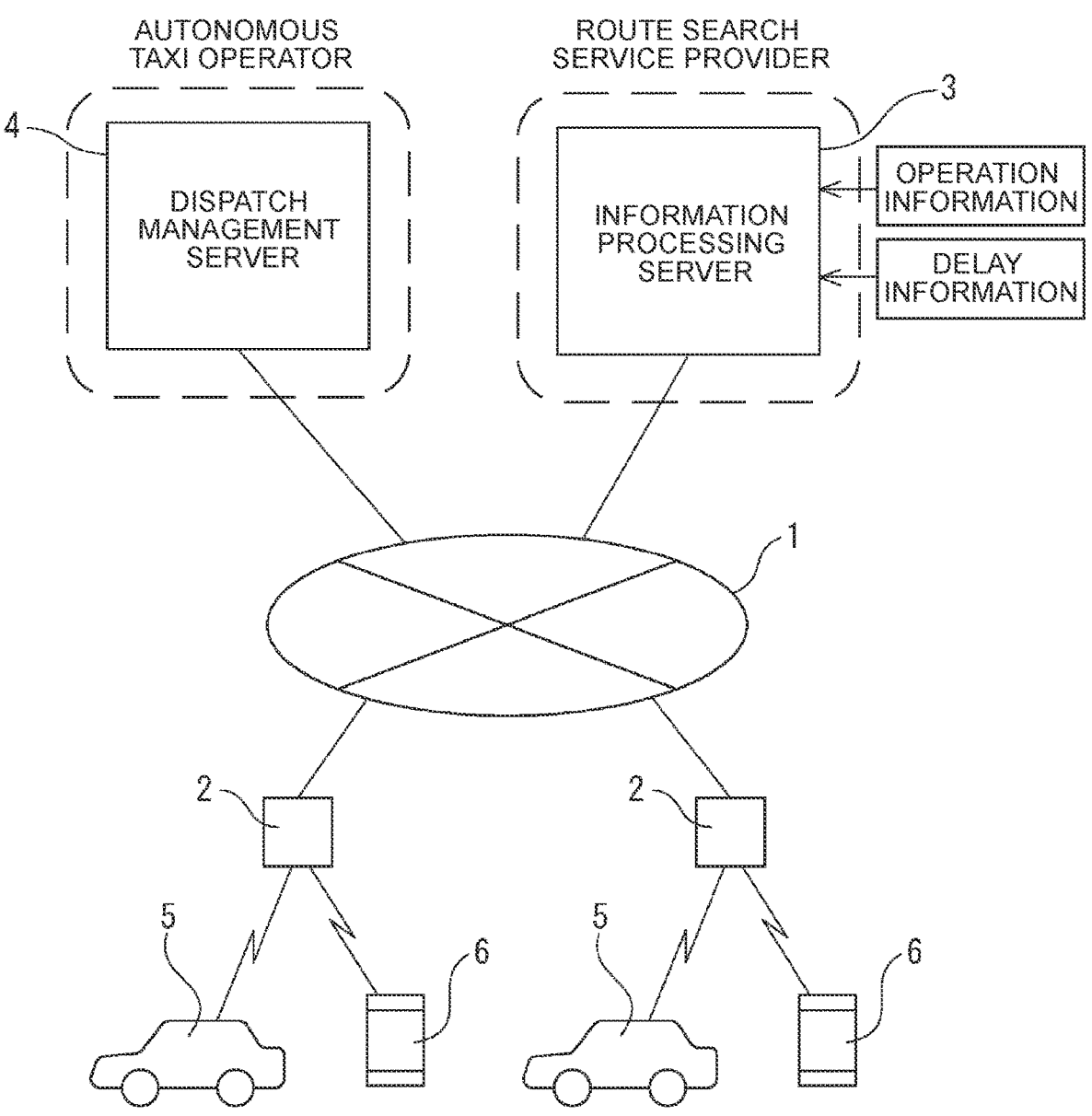
FIG. 1 is an overall diagram of an information processing system.

FIG. 1 is an overall diagram of an information processing system suitable for implementing the information processing technology according to the present disclosure. Referring to FIG. 1, reference symbol 1 represents a communication network, reference symbol 2 represents a base station of the communication network 1, reference symbol 3 represents an information processing server managed by a route search service provider, reference symbol 4 represents a dispatch management server that is managed by an autonomous taxi operator and provides an autonomous taxi dispatch service, reference symbol 5 represents an autonomous taxi, and reference symbol 6 represents a terminal owned by a user who uses the dispatch service of the autonomous taxi 5. Although the terminal 6 is depicted as a mobile terminal in FIG. 1, the terminal 6 is not limited to the mobile terminal and may be a stationary terminal.

Figure 2:
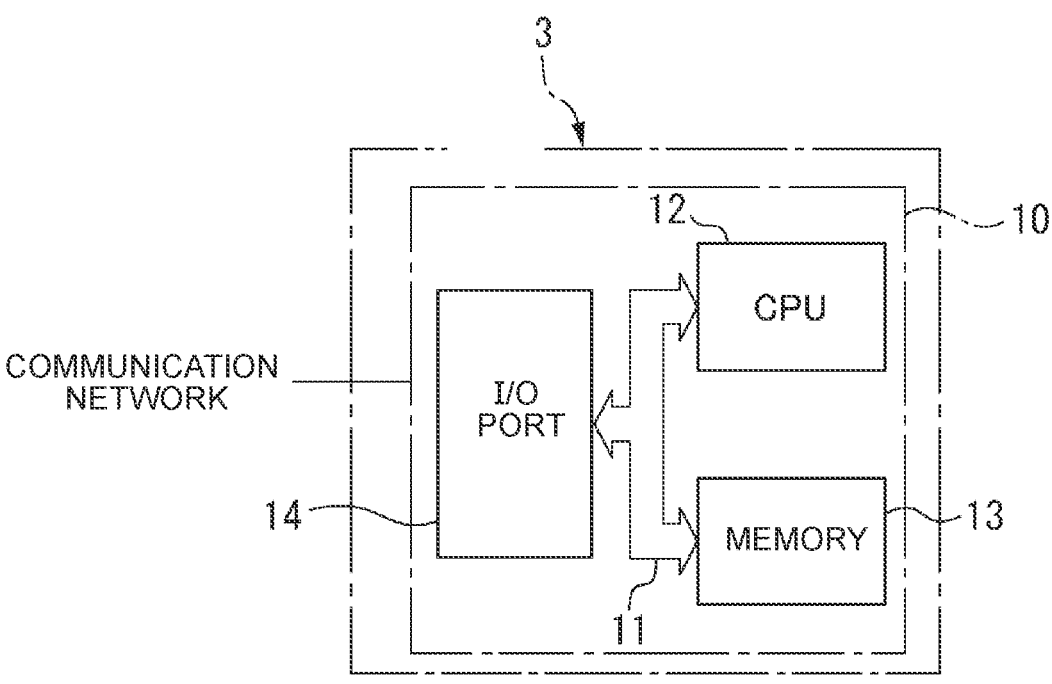
FIG. 2 is a diagram schematically showing an information processing server shown in FIG. 1.

FIG. 2 shows the information processing server 3 shown in FIG. 1. Referring to FIG. 2, an electronic control unit 10 is provided in the information processing server 3. The electronic control unit 10 is a digital computer and includes a central processing unit (CPU) (microprocessor) 12, a memory 13 including a read only memory (ROM) and a random access memory (RAM), and an input/output port 14. These components are connected by a bidirectional bus 11. The electronic control unit 10 is connected to the communication network 1.

Figure 3:
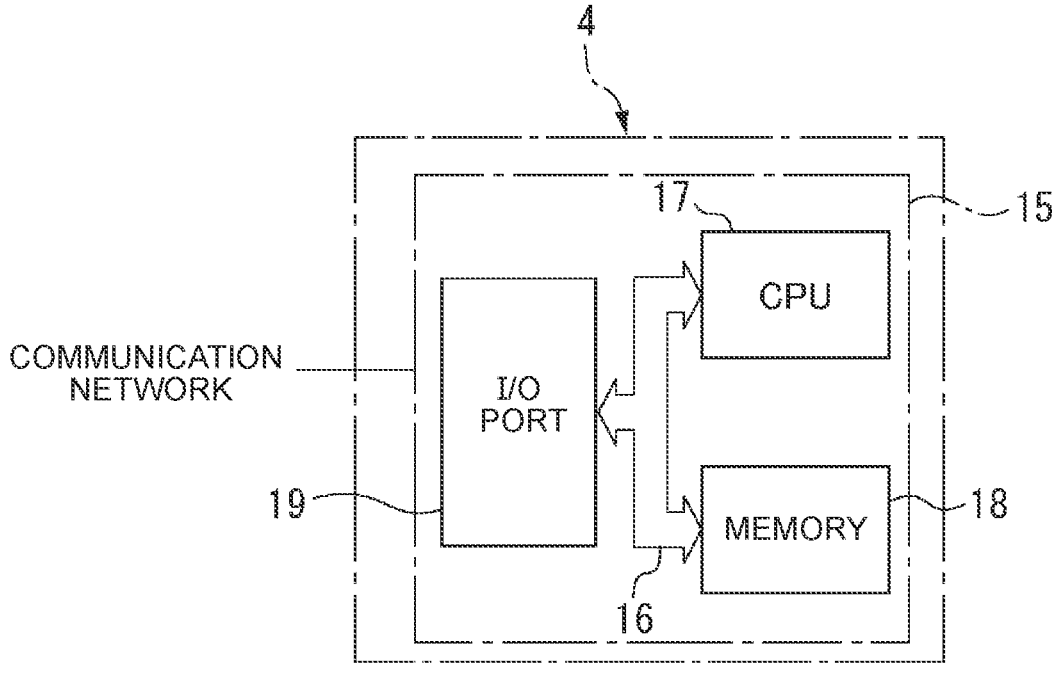
FIG. 3 is a diagram schematically showing a dispatch management server shown in FIG. 1.

FIG. 3 shows the dispatch management server 4 shown in FIG. 1. Referring to FIG. 3, an electronic control unit 15 is provided in the dispatch management server 4. The electronic control unit 15 is a digital computer and includes a CPU (microprocessor) 17, a memory 18 including a ROM and a RAM, and an input/output port 19. These components are connected by a bidirectional bus 16. The electronic control unit 15 is connected to the communication network 1.

Figures 4, 5:
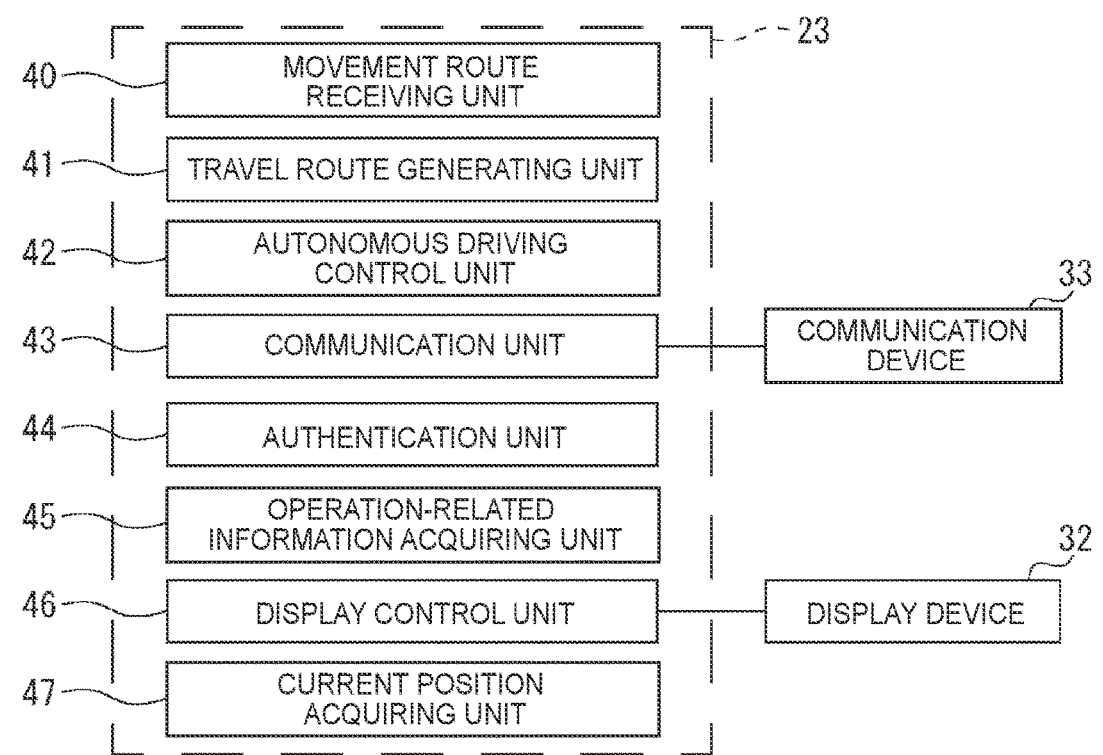
FIG. 4 is a diagram schematically showing an autonomous taxi.
FIG. 5 is a functional configuration diagram of the autonomous taxi shown in FIG. 4.

FIG. 4 schematically shows an example of the autonomous taxi 5. Referring to FIG. 4, reference symbol 20 represents a vehicle drive unit for applying a driving force to driving wheels of the autonomous taxi 5, reference symbol 21 represents a braking device for braking the autonomous taxi 5, reference symbol 22 represents a steering device for steering the autonomous taxi 5, and reference symbol 23 represents an electronic control unit mounted in the autonomous taxi 5. As shown in FIG. 4, the electronic control unit 23 is a digital computer and includes a CPU (microprocessor) 25, a memory 26 including a ROM and a RAM, and an input/output port 27. These components are connected by a bidirectional bus 24. In the example shown in FIG. 4, the vehicle drive unit 20 is an electric motor to be driven by a secondary battery or an electric motor to be driven by a fuel cell, and the drive of the driving wheels is controlled by the electric motor based on an output signal from the electronic control unit 23. The braking of the autonomous taxi 5 is controlled by the braking device 21 based on an output signal from the electronic control unit 23, and the steering of the autonomous taxi 5 is controlled by the steering device 22 based on an output signal from the electronic control unit 23. The electronic control unit 23 may be constituted by one electronic control unit or by a plurality of electronic control units.

As shown in FIG. 4, the autonomous taxi 5 includes various sensors 28 necessary for autonomous driving of the autonomous taxi 5, that is, sensors that detect conditions of the autonomous taxi 5 and peripheral detection sensors that detect the periphery of the autonomous taxi 5. In this case, an acceleration sensor, a speed sensor, and an azimuth angle sensor are used as the sensors that detect the conditions of the autonomous taxi 5, and on-board cameras that capture forward, lateral, and rearward images from the autonomous taxi 5, a light detection and ranging (LIDAR) sensor, a radar, etc. are used as the peripheral detection sensors that detect the periphery of the autonomous taxi 5. The autonomous taxi 5 includes a global navigation satellite system (GNSS) receiver 29, a map data storage device 30, a navigation device 31, and a display device 32 including a display screen.

The GNSS receiver 29 can detect a current position (e.g., latitude and longitude) of the autonomous taxi 5 based on information acquired from a plurality of satellites. Therefore, the current position of the autonomous taxi 5 can be acquired by the GNSS receiver 29. Examples of the GNSS receiver 29 include a global positioning system (GPS) receiver. The map data storage device 30 stores map data etc. necessary for the autonomous driving of the autonomous taxi 5. The various sensors 28, the GNSS receiver 29, the map data storage device 30, the navigation device 31, and the display device 32 are connected to the electronic control unit 23. The autonomous taxi 5 includes a communication device 33 for communicating with the information processing server 3 and the dispatch management server 4 via the base station 2 and the communication network 1.

The terminal 6 owned by the user who uses the dispatch service can communicate with the information processing server 3, the dispatch management server 4, and the autonomous taxi 5 via the base station 2 and the communication network 1. Thus, in the information processing system shown in FIG. 1, the information processing server 3, the dispatch management server 4, the autonomous taxi 5, and the terminal 6 can communicate with each other via the communication network 1. In the example shown in FIG. 1, the communication device 33 of the autonomous taxi 5 and the terminal 6 each have a short-range wireless communication function. The communication device 33 of the autonomous taxi 5 and the terminal 6 can communicate with each other by their short-range wireless communication functions.

Figure 6:
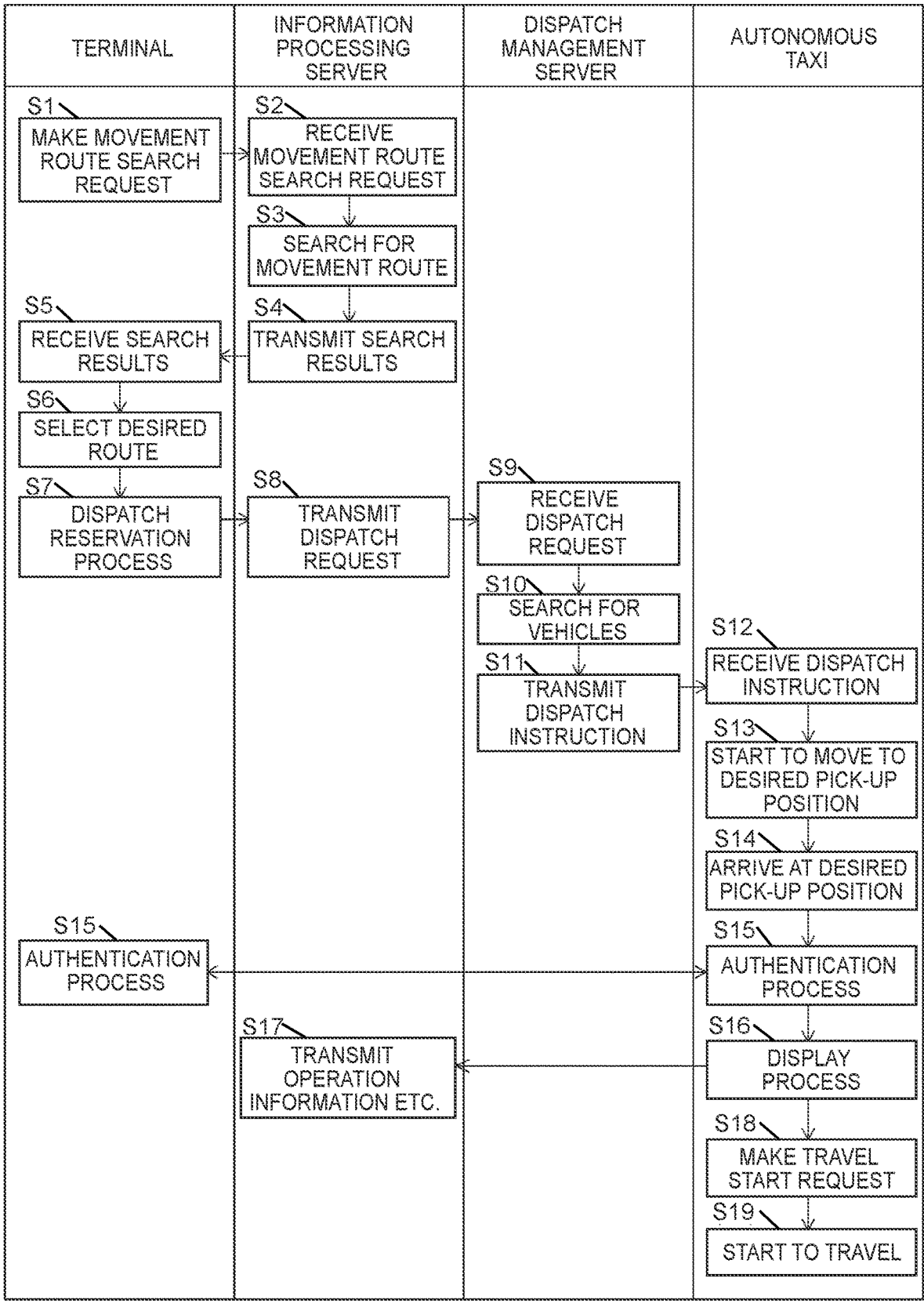
FIG. 6 is a diagram showing an overall flow of information processing in the information processing system.

Next, an overall flow of information processing used in an embodiment of the present disclosure will be described with reference to FIG. 6. FIG. 6 shows exchange among the information processing server 3, the dispatch management server 4, the autonomous taxi 5, and the terminal 6. FIG. 6 shows a case where a movement route including transfer to a scheduled train after taking the autonomous taxi 5 is selected. Referring to FIG. 6, the user who uses the dispatch service (hereinafter simply referred to as "user") uses a movement route search application on the terminal 6 in S1 to input a departure point, a departure time, a destination, a desired arrival time at the destination, etc., and make a movement route search request.

In S2, the information processing server 3 receives the movement route search request. In S3, the information processing server 3 searches for a movement route that fulfills the request based on the received departure point, the received departure time, the received destination, the received desired arrival time at the destination, etc. In S4, movement route search results are transmitted from the information processing server 3 to the terminal 6. In S5, the terminal 6 receives the movement route search results. In S6, the user uses the movement route search application on the display screen of the terminal 6 to select a desired movement route from among a plurality of movement routes in the search results.

There may be a case where the movement route search results in S4 do not include a movement route involving transfer from the autonomous taxi 5 to a scheduled train. In the information processing flow shown in FIG. 6, description will be given of a case where the movement route search results in S4 include the movement route involving transfer from the autonomous taxi 5 to a scheduled train, and the movement route involving transfer from the autonomous taxi 5 to a scheduled train is selected as the desired movement route in S6.

When the movement route involving transfer from the autonomous taxi 5 to a scheduled train is selected in S6, the user uses a dispatch reservation application on the display screen of the terminal 6 in S7 to register desired dispatch details including a desired pick-up position, a desired pick-up time, and a desired drop-off position for the autonomous taxi 5. When the desired dispatch details are registered, information indicating that a dispatch reservation has been made is transmitted from the terminal 6 to the information processing server 3 together with the registered desired dispatch details and the user's desired movement route. When the information processing server 3 receives the information indicating that the dispatch reservation has been made from the terminal 6 together with the desired dispatch details and the user's desired movement route, the received desired dispatch details and the received user's desired movement route are stored in the memory 18 of the information processing server 3. In S8, a dispatch request is transmitted from the information processing server 3 to the dispatch management server 4. The dispatch request includes the user's desired movement route, information on the train expected for transfer on the user's desired movement route, the desired dispatch details including the desired pick-up position, the desired pick-up time, and the desired drop-off position for the autonomous taxi 5, and a user identifier (ID) for identifying the user. The dispatch request may include the user's departure point, departure time, destination, and desired arrival time at the destination received by the information processing server 3 in S2.

In S9, the dispatch management server 4 receives the dispatch request. In S10, the dispatch management server 4 searches for autonomous taxis 5 that can be dispatched to the user's desired pick-up position at the user's desired pick-up time from among the autonomous taxis 5 located near the user's desired pick-up position, and selects an autonomous taxi 5 to be dispatched. In this case, the search may be made for currently available autonomous taxis 5, and autonomous taxis 5 scheduled to become available around the user's desired pick-up time based on reservation information. When the autonomous taxi 5 to be dispatched is selected, a dispatch instruction is transmitted from the dispatch management server 4 to the autonomous taxi 5 selected for dispatch in S11 together with the user's desired movement route, the information on the train expected for transfer on the user's desired movement route, the desired dispatch details including the pick-up position, the drop-off position, and the pick-up time for the autonomous taxi 5, and the user ID.

In S12, the autonomous taxi 5 receives the dispatch instruction. Based on the received user's desired pick-up position, the electronic control unit 23 of the autonomous taxi 5 generates a travel route from the current position to the user's desired pick-up position. In S13, autonomous driving of the autonomous taxi 5 is started, and the autonomous taxi 5 travels along the generated travel route to arrive at the user's desired pick-up position at the user's desired pick-up time. In S14, the autonomous taxi 5 arrives at the user's desired pick-up position. In S15, a user authentication process is performed by short-range communication between the terminal 6 of the user who has made the dispatch reservation and the autonomous taxi 5 when the user gets into the autonomous taxi 5. The authentication process is performed, for example, by checking the user ID stored in the memory 26 of the autonomous taxi 5 in response to the dispatch request against the user ID stored in the terminal 6 of the user who has made the dispatch request. When the user IDs agree with each other, the user who carries the terminal 6 is authenticated as the user who has made the dispatch request. Various authentication processes such as face authentication are known as user authentication processes. These known authentication processes can be used as the authentication process in S15.

When the user authentication process is performed for the user getting into the autonomous taxi 5 in S15, a display process is performed in S16 to display operation-related information of the train expected for transfer on the display screen of the display device 32 disposed in the autonomous taxi 5. In other words, when a passenger authentication process is performed for a passenger getting into the autonomous taxi 5, a display process is performed in S16 to display operation-related information of a train expected for transfer on the display screen of the display device 32 disposed in the autonomous taxi 5. A specific example of the display process will be described with reference to FIGS. 7 to 9.

Figure 7:
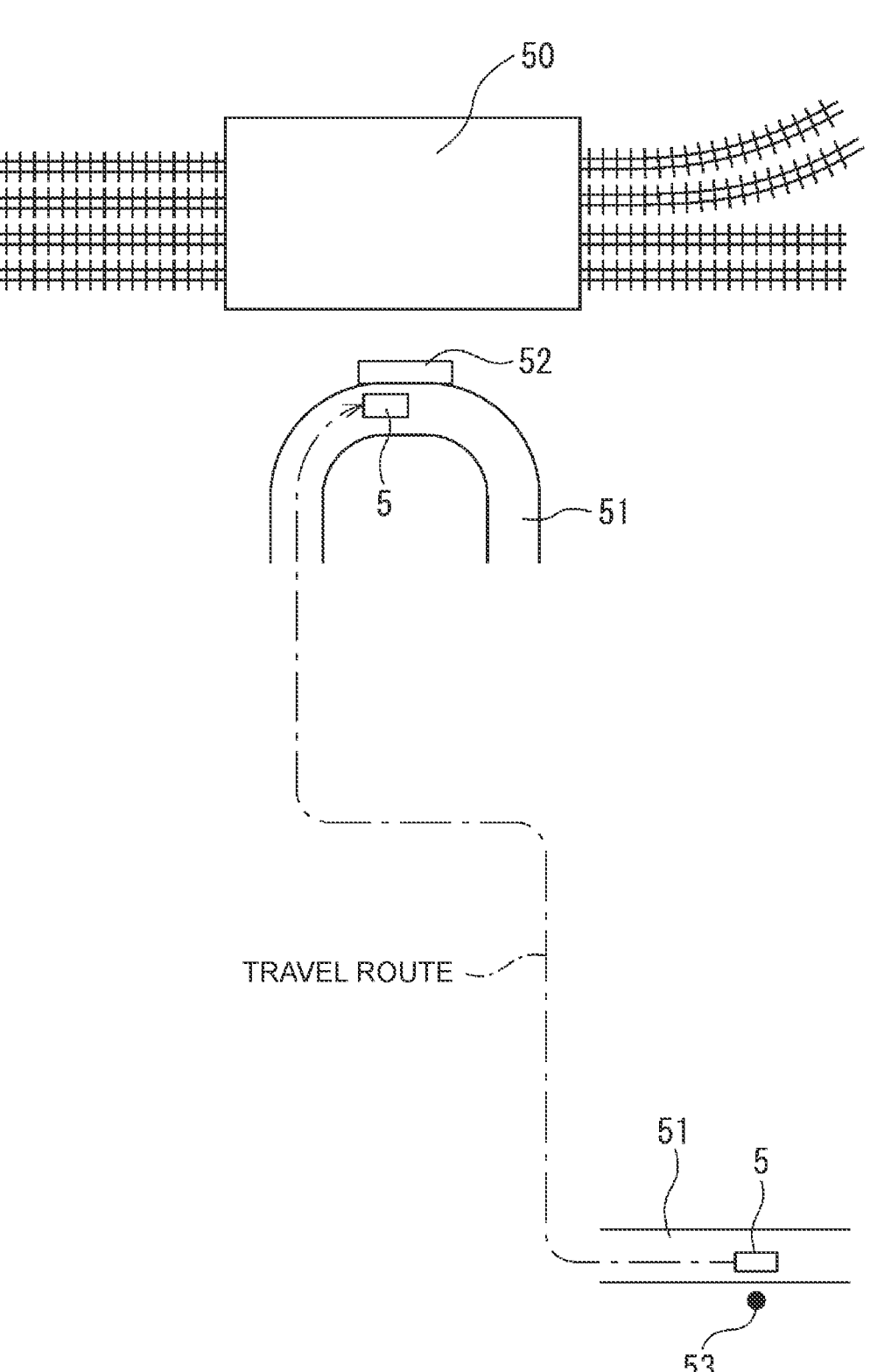
FIG. 7 is a diagram showing a schematic road map.
Figure 8:
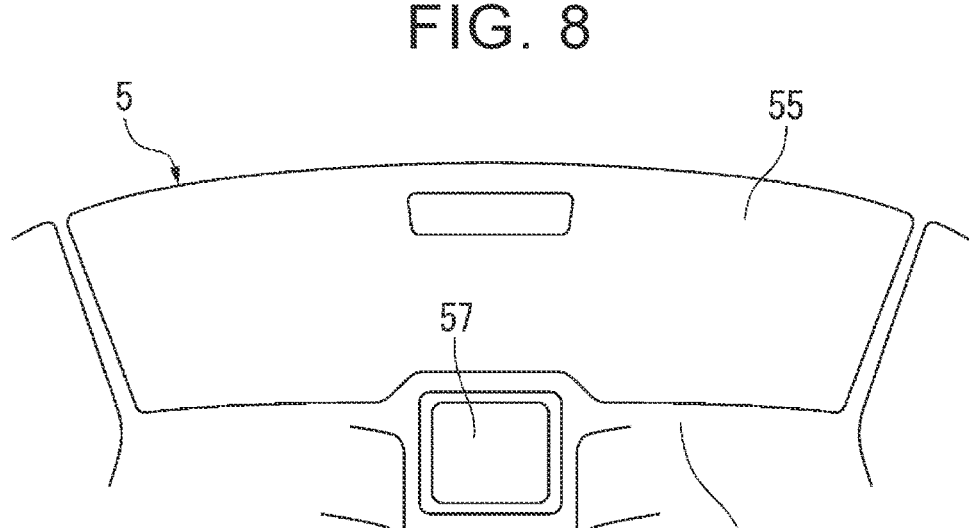
FIG. 8 is a diagram showing a vehicle cabin of the autonomous taxi.

FIG. 7 schematically shows an example of a road map including a railroad station. In FIG. 7, reference symbol 50 represents a railroad station, reference symbol 51 represents a part of a road, reference symbol 52 represents a pick-up and drop-off position of vehicles for transfer to trains, that is, a transfer place for trains, and reference symbol 53 represents a user's desired pick-up position for the autonomous taxi 5. FIG. 7 shows a case where a user's desired drop-off position is the pick-up and drop-off position 52 of vehicles, that is, the transfer place for trains. FIG. 8 shows a vehicle cabin of the autonomous taxi 5. In FIG. 8, reference symbol 55 represents a windshield, reference symbol 56 represents a dashboard at the front of the vehicle cabin, and reference symbol 57 represents the display screen of the display device 32 disposed in the vehicle cabin. In S14 of FIG. 6, the autonomous taxi 5 arrives at the user's desired pick-up position 53 shown in FIG. 7. In S15 of FIG. 6, the passenger authentication process is performed. When the passenger is authenticated, the operation-related information of the train expected for transfer is displayed on the display screen 57 of the display device 32 shown in FIG. 8 in S16 of FIG. 6.

Figure 9:
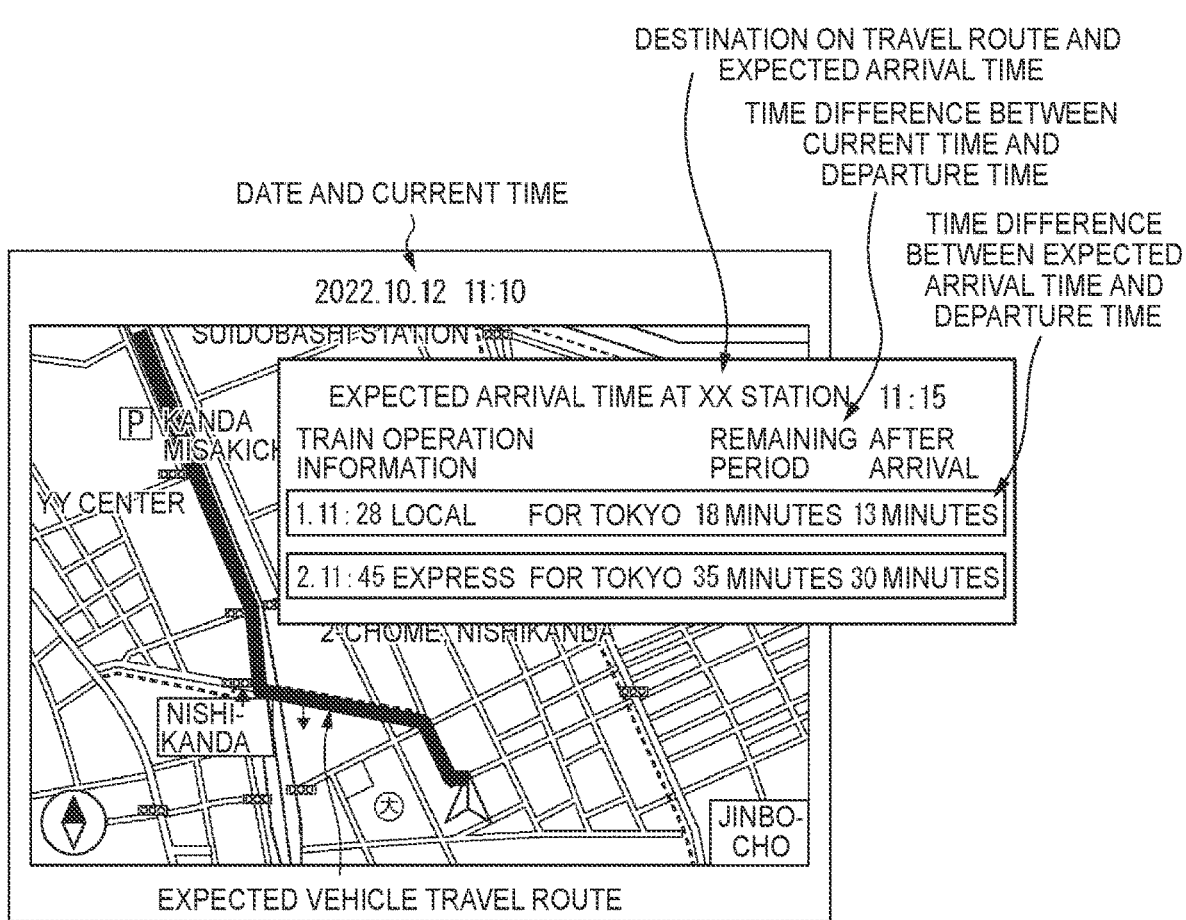
FIG. 9 is a diagram showing an example of display contents displayed on a display screen.

FIG. 9 shows a specific example of the operation-related information of the train expected for transfer that is displayed on the display screen 57. In the specific example shown in FIG. 9, the navigation device 31 displays a date and a current time on a peripheral blank area of a map screen showing a vehicle travel route or a blank area in a part of the map screen. In addition, a destination on the vehicle travel route and an expected arrival time of the vehicle are displayed as "Expected arrival time at XX Station". Operation information of the train expected for transfer (departure time, type such as "local", "express", or "limited express", and destination) is displayed as "train operation information". That is, the operation-related information of the train expected for transfer that is displayed on the display screen 57 includes the departure time, the type such as "local", "express", or "limited express", and the destination of the train expected for transfer. In the specific example shown in FIG. 9, a plurality of trains different in departure times and types is displayed.

In this specific example, regarding the operation information of the transportation system expected for transfer, a time difference between the current time and the departure time of the train expected for transfer, that is, the remaining period to the departure time is displayed as "Remaining period: AA minutes", and a time difference between the expected arrival time at the transfer place and the departure time of the train expected for transfer, that is, a time difference Δt between the expected arrival time of the vehicle and the departure time of the train is displayed as "After arrival: BB minutes". Therefore, the operation-related information of the train expected for transfer that is displayed on the display screen 57 includes the time difference between the current time and the departure time of the train expected for transfer and the time difference between the expected arrival time at the transfer place and the departure time of the train expected for transfer.

Thus, in this specific example, the operation information of the train expected for transfer (departure time, type such as "local", "express", or "limited express", and destination) is displayed on the display screen 57 disposed in the vehicle cabin. Therefore, the passenger of the autonomous taxi 5 can view the operation information of the train expected for transfer on the on-board display screen 57 while riding in the autonomous taxi 5. Accordingly, it is very convenient for the passenger of the autonomous taxi 5. In this specific example, the remaining period to the departure time is displayed on the display screen 57. Therefore, the passenger of the autonomous taxi 5 can determine whether to hurry to the transfer to the train. Accordingly, it is very convenient for the passenger of the autonomous taxi 5. In this specific example, the time difference Δt between the expected arrival time of the vehicle and the departure time of the train is displayed on the display screen 57. Therefore, the passenger of the autonomous taxi 5 can determine a time margin before getting on the train. Accordingly, it is very convenient for the passenger of the autonomous taxi 5.

The operation-related information of the train expected for transfer as shown in FIG. 9 is transmitted from the information processing server 3 to the autonomous taxi 5 in S17 of FIG. 6 when a request to provide the operation-related information of the train is made from the autonomous taxi 5. Returning to FIG. 6, when the display process for the operation-related information of the train expected for transfer on the display screen 57 of the display device 32 is performed in S16 of FIG. 6, the door of the autonomous taxi 5 is opened and the user or some people and the user get(s) into the autonomous taxi 5. When a pick-up check device disposed in the autonomous taxi 5 determines that the user or some people and the user has/have got into the taxi, the door of the autonomous taxi 5 is closed. In S18, a travel start request for the autonomous taxi 5 is made. As shown in FIG. 7, the electronic control unit 23 of the autonomous taxi 5 generates a travel route from the current position to the user's desired drop-off position 52. In S19, autonomous driving of the autonomous taxi 5 is started.

Next, the configurations of the information processing server 3, the dispatch management server 4, the autonomous taxi 5, and the terminal 6 for execution of the overall flow of the information processing shown in FIG. 6 will be described sequentially. First, the configuration of the information processing server 3 will be described. The information processing server 3 can communicate with the dispatch management server 4, the autonomous taxi 5, and the terminal 6 via the communication network 1. The information processing server 3 includes a railroad information receiving unit configured to receive railroad operation information and railroad delay information in real time from a railroad operator via the communication network 1. The information processing server 3 includes a search request receiving unit that receives a movement route search request from the user's terminal 6 together with a departure point, a departure time, a destination, a desired arrival time at the destination, etc. The information processing server 3 includes a movement route search unit configured to search for a plurality of movement routes including a multimodal movement route using at least the autonomous taxi 5 and a train based on the departure point, the departure time, the destination, the desired arrival time at the destination, etc. received by the search request receiving unit.

The information processing server 3 includes a search result transmitting unit for transmitting, to the user's terminal 6, the movement routes in the search results obtained by the movement route search unit. The information processing server 3 includes a dispatch reservation receiving unit that receives, from the user's terminal 6, desired dispatch details including a desired pick-up position, a desired pick-up time, and a desired drop-off position for the autonomous taxi 5 and information indicating that a dispatch reservation has been made together with a user's desired movement route. The information processing server 3 acquires the user's desired movement route, the desired dispatch details including the pick-up position, the drop-off position, and the pick-up time for the autonomous taxi 5 to be used by the user on the user's desired movement route, and information on a train expected for transfer on the user's desired movement route. The information processing server 3 includes a dispatch request transmitting unit that transmits, to the dispatch management server 4, a dispatch request including the acquired user's desired movement route, the acquired desired dispatch details, and the acquired information on the train. The information processing server 3 includes an operation-related information transmitting unit that transmits operation-related information of the train to the autonomous taxi 5 when a request to provide the operation-related information of the train is made from the autonomous taxi 5.

Next, the configuration of the dispatch management server 4 will be described. The dispatch management server 4 can communicate with the information processing server 3, the autonomous taxi 5, and the terminal 6 via the communication network 1. The dispatch management server 4 includes a dispatch request receiving unit for receiving, from the information processing server 3, the user's desired movement route, the desired dispatch details including the pick-up position, the drop-off position, and the pick-up time for the autonomous taxi 5 to be used by the user, and information on the train expected for transfer. The dispatch management server 4 includes a vehicle search unit that searches for autonomous taxis 5 that can be dispatched to the user's desired pick-up position at the user's desired pick-up time from among the autonomous taxis 5 located near the user's desired pick-up position, and selects an autonomous taxi 5 to be dispatched. The dispatch management server 4 includes a dispatch instruction transmitting unit for transmitting, to the autonomous taxi 5 selected for dispatch, a dispatch instruction together with the user's desired movement route, the desired dispatch details including the pick-up position, the drop-off position, and the pick-up time for the autonomous taxi 5 to be used by the user, and information on the train expected for transfer.

Next, the configuration of the terminal 6 will be described. The terminal 6 includes a communication unit for communicating with the information processing server 3, the dispatch management server 4, and the autonomous taxi 5 via the communication network 1. The terminal 6 includes a current position acquiring unit such as a GPS receiver that can detect a current position (e.g., latitude and longitude) of the terminal 6. The terminal 6 includes a display screen. The terminal 6 uses the movement route search application on the display screen of the terminal 6 to input a departure point, a departure time, a destination, a desired arrival time at the destination, etc., and make a movement route search request. The terminal 6 can display a plurality of movement routes in the search results obtained by the information processing server 3 on the display screen of the terminal 6. On the display screen of the terminal 6, the terminal 6 can select a movement route desired by the user from among the movement routes in the search results obtained by the information processing server 3, and make a dispatch reservation for the autonomous taxi 5. In this case, the dispatch reservation application may be used on the display screen of the terminal 6 to make a dispatch reservation directly to the dispatch management server 4.

Finally, the configuration of the autonomous taxi 5 will be described. Since the overall configuration of the autonomous taxi 5 has already been described with reference to FIG. 4, various types of control to be performed by the electronic control unit 23 of the autonomous taxi 5 will be described with reference to a functional configuration diagram of FIG. 5. Referring to FIG. 5, the autonomous taxi 5 includes a movement route receiving unit 40, a travel route generating unit 41, an autonomous driving control unit 42, a communication unit 43, an authentication unit 44, an operation-related information acquiring unit 45, a display control unit 46, and a current position acquiring unit 47. The information processing device according to one embodiment of the present disclosure is constituted by the movement route receiving unit 40, the communication unit 43, the operation-related information acquiring unit 45, and the display control unit 46.

In FIG. 5, the movement route receiving unit 40 receives, from the dispatch management server 4, the user's desired movement route, the desired dispatch details including the pick-up position, the drop-off position, and the pick-up time for the autonomous taxi 5 to be used by the user, and the information on the train expected for transfer. In this case, the movement route receiving unit 40 may receive these pieces of information etc. from the information processing server 3. Based on these pieces of information, the travel route generating unit 41 generates a travel route of the autonomous taxi 5 from the current position to the user's desired pick-up position, and a travel route of the autonomous taxi 5 from the user's desired pick-up position to user's desired drop-off position.

The autonomous driving control unit 42 controls the autonomous driving of the autonomous taxi 5 along the generated travel route. The communication unit 43 is connected to the communication device 33 and can communicate with the information processing server 3, the dispatch management server 4, and the terminal 6 via the communication device 33. The authentication unit 44 authenticates a person getting into the autonomous taxi 5 as the user who has made the dispatch reservation for the autonomous taxi 5. The operation-related information acquiring unit 45 acquires the operation-related information of the train from the information processing server 3. The display control unit 46 is connected to the display device 32 including the display screen disposed in the autonomous taxi 5, and controls display contents of the display screen 57 disposed in the autonomous taxi 5. The current position acquiring unit 47 acquires the current position of the autonomous taxi 5 based on reception data received by the GNSS receiver 29.

Next, an embodiment for execution of the overall flow shown in FIG. 6 will be described with reference to FIGS. 10 to 18.

Figure 10:
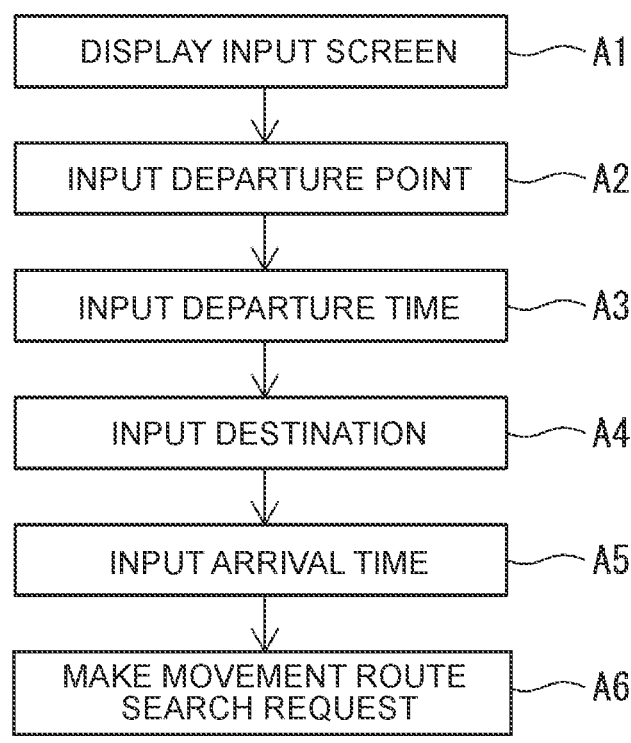
FIG. 10 is a diagram showing an input procedure on a terminal.

FIG. 10 shows an input procedure performed on the terminal 6 by the user in S1 of FIG. 6. Referring to FIG. 10, a movement route search input screen is first displayed on the display screen of the terminal 6 in A1 by using the movement route search application. In A2, a departure point is entered in, for example, a departure point entry field of the input screen. In this case, the departure point may be specified on a map displayed on the display screen of the terminal 6. In A3, a departure time is entered in a departure time entry field of the input screen. In A4, a destination is entered in, for example, a destination entry field of the input screen. In this case as well, the destination may be specified on the map displayed on the display screen of the terminal 6. In A5, a desired arrival time at the destination is entered in a desired arrival time entry field of the input screen. In A6, for example, a search request button displayed on the input screen is touched. When the search request button is touched, a movement route search request is transmitted to the information processing server 3 together with the input departure point, the input departure time, the input destination, and the input desired arrival time at the destination.

Figure 11:
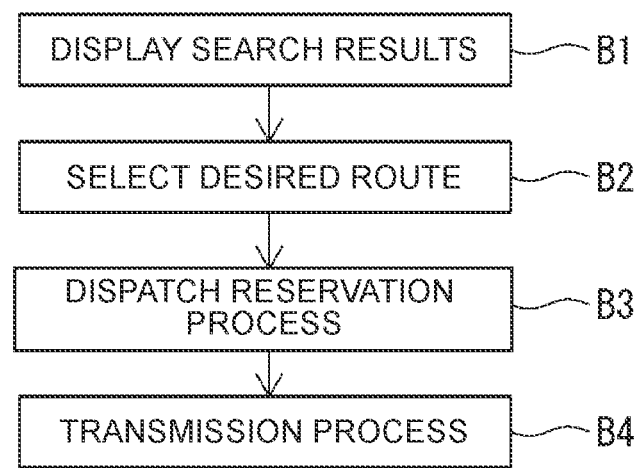
FIG. 11 is a diagram showing a route selection procedure on the terminal.

FIG. 11 shows a route selection procedure performed on the terminal 6 by the user in S5 to S7 of FIG. 6. Referring to FIG. 11, search results showing a plurality of movement routes transmitted from the information processing server 3 are first displayed on the display screen of the terminal 6 in B1. In B2, a desired movement route is selected from among these movement routes. Description will be given of a case where a movement route involving transfer from the autonomous taxi 5 to a scheduled train is selected as the desired movement route. When the desired movement route is selected in B2, the user uses the dispatch reservation application on the display screen of the terminal 6 in B3 to register desired dispatch details including a desired pick-up position, a desired pick-up time, and a desired drop-off position for the autonomous taxi 5 in entry fields for the desired pick-up position, the desired pick-up time, and the desired drop-off position. In this case as well, the desired pick-up position and the desired drop-off position may be registered by specifying the desired pick-up position and the desired drop-off position on the map displayed on the display screen of the terminal 6. When the desired dispatch details including the desired pick-up position, the desired pick-up time, and the desired drop-off position are registered, information indicating that a dispatch reservation has been made is transmitted from the terminal 6 to the information processing server 3 in B4 together with the registered desired dispatch details and the user's desired movement route.

Figure 12:
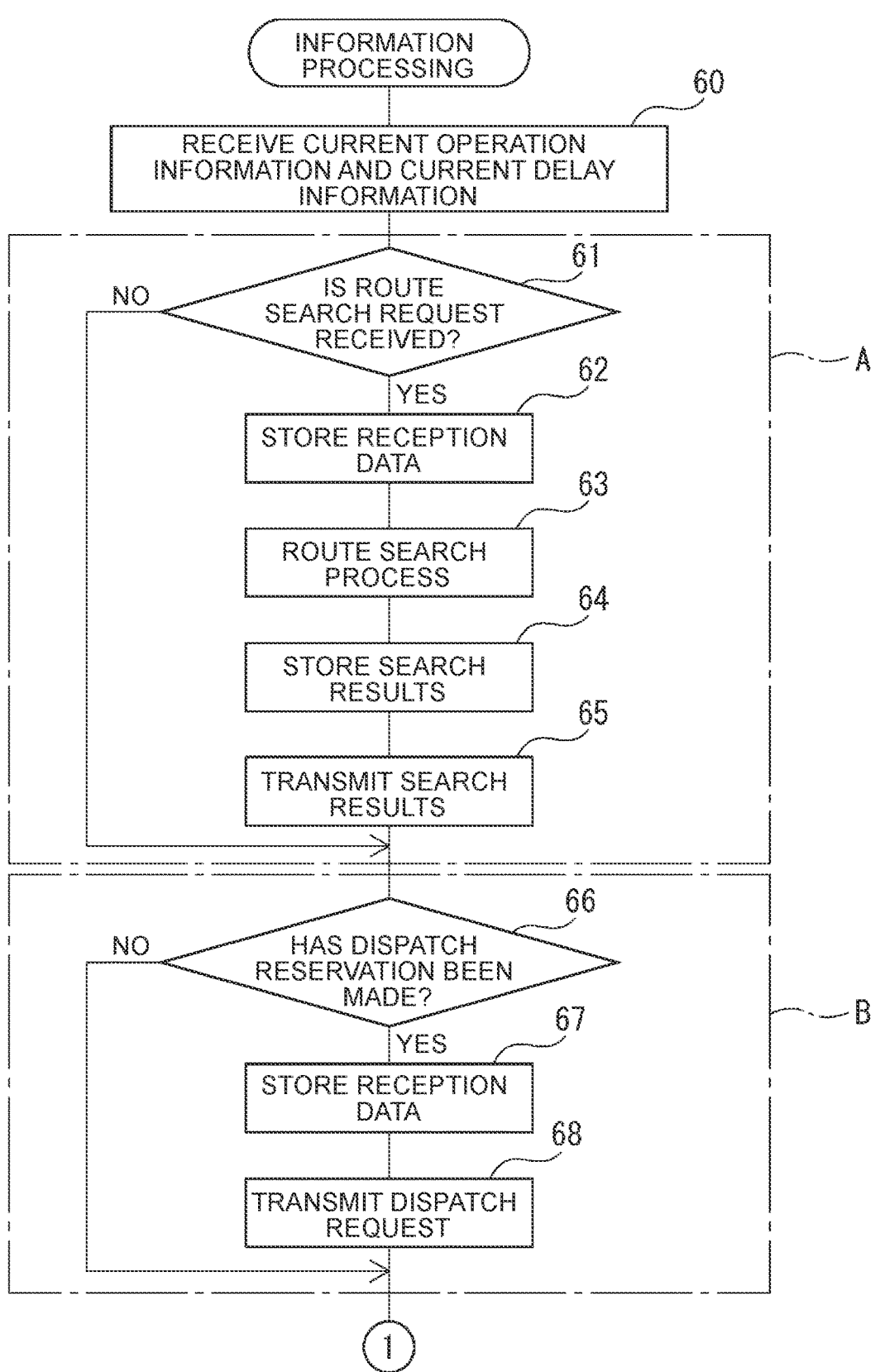
FIG. 12 is a flowchart for information processing.
Figure 13:
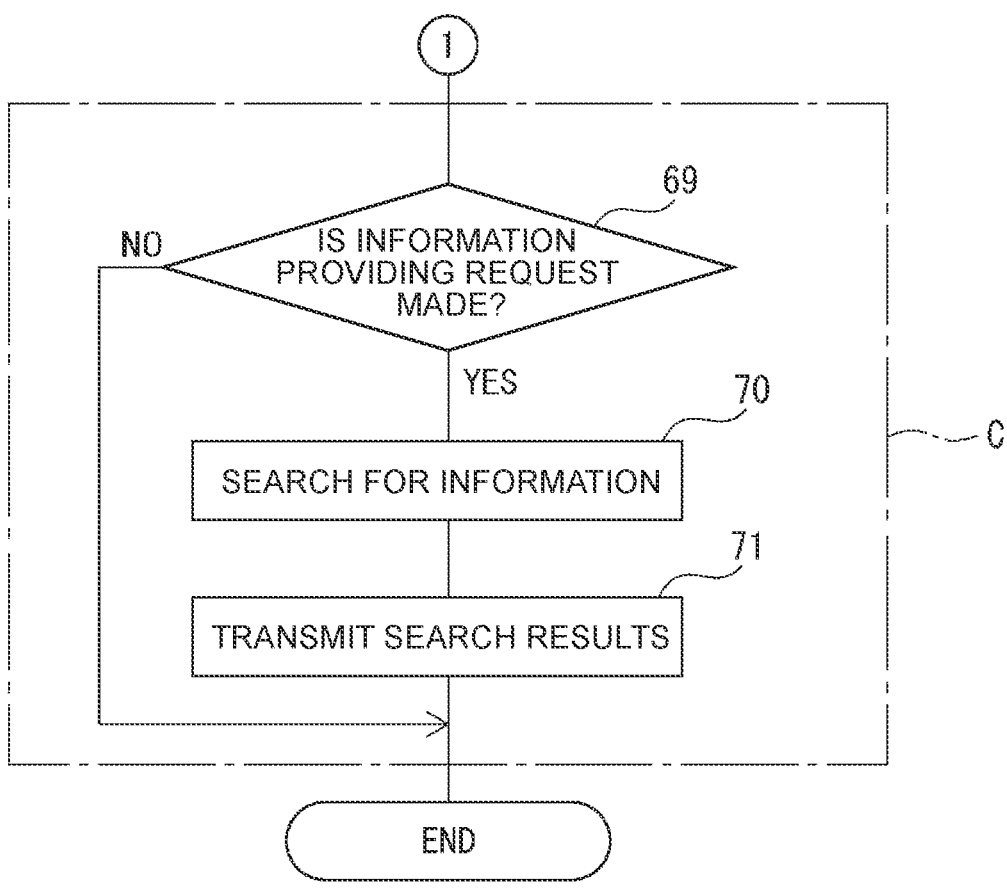
FIG. 13 is a flowchart for the information processing.

FIGS. 12 and 13 show an information processing routine to be executed by the electronic control unit 10 of the information processing server 3. This routine is repeatedly executed.

Referring to FIGS. 12 and 13, current railroad operation information and current railroad delay information are first received from a railroad operator in step 60. The received current railroad operation information and the received current railroad delay information are stored in the memory 13 of the electronic control unit 10. In part A from step 61 to step 65, the process from S2 to S4 of FIG. 6 is performed.

That is, in step 61, determination is made as to whether a movement route search request is received from the terminal 6. When determination is made that the movement route search request is received from the terminal 6, the routine proceeds to step 62, and reception data including the user's departure point, departure time, destination, and desired arrival time at the destination and received together with the movement route search request is stored in the memory 13 of the electronic control unit 10. In step 63, a search is made for a plurality of movement routes that satisfies the user's request. In step 64, results of the movement route search are stored in the memory 13 of the electronic control unit 10. In step 65, the results of the movement route search are transmitted to the terminal 6. Then, the routine proceeds to step 66. When determination is made in step 61 that the movement route search request is not received from the terminal 6, the routine jumps to step 66.

In part B from step 66 to step 68, the process in S8 of FIG. 6 is performed. That is, in step 66, determination is made as to whether information indicating that a dispatch reservation has been made is received from the terminal 6 together with a desired pick-up position, a desired pick-up time, and a desired drop-off position for the autonomous taxi 5 and a user's desired movement route. When determination is made that the information indicating that the dispatch reservation has been made is received from the terminal 6, the routine proceeds to step 67, and the received desired pick-up position, the received desired pick-up time, the received desired drop-off position, and the received user's desired movement route are stored in the memory 13 of the electronic control unit 10. In step 68, a dispatch request including the user's desired movement route, information on a train expected for transfer on the user's desired movement route, the desired pick-up position, the desired pick-up time, and the desired drop-off position for the autonomous taxi 5, and a user ID for identifying the user is transmitted to the dispatch management server 4. Then, the routine proceeds to step 69. When determination is made in step 66 that the information indicating that the dispatch reservation has been made is not received from the terminal 6, the routine jumps to step 69.

In part C from step 69 to step 71, the process in S17 of FIG. 6 is performed. That is, in step 69, determination is made as to whether a request to provide current operation information and current delay information of the train expected for transfer is made from the autonomous taxi 5. When determination is made that the request to provide the current operation information and the current delay information of the train expected for transfer is made, the routine proceeds to step 70, and a search is made for the current operation information and the current delay information of the train expected for transfer. Then, the routine proceeds to step 71, and results of the search for the current operation information and the current delay information of the train expected for transfer are transmitted to the autonomous taxi 5. Then, the processing cycle is terminated. When determination is made in step 69 that the request to provide the current operation information and the current delay information of the train expected for transfer is not made, the processing cycle is terminated.

Figure 14:
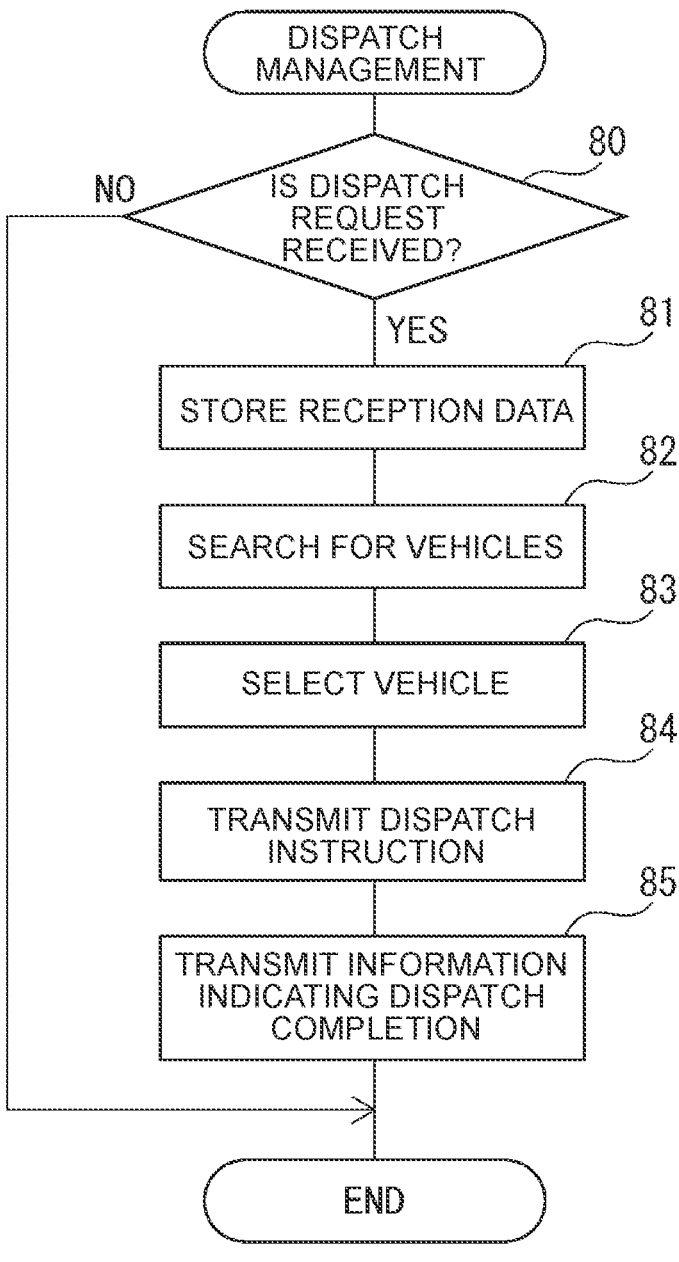
FIG. 14 is a flowchart for dispatch management.
Figure 15:
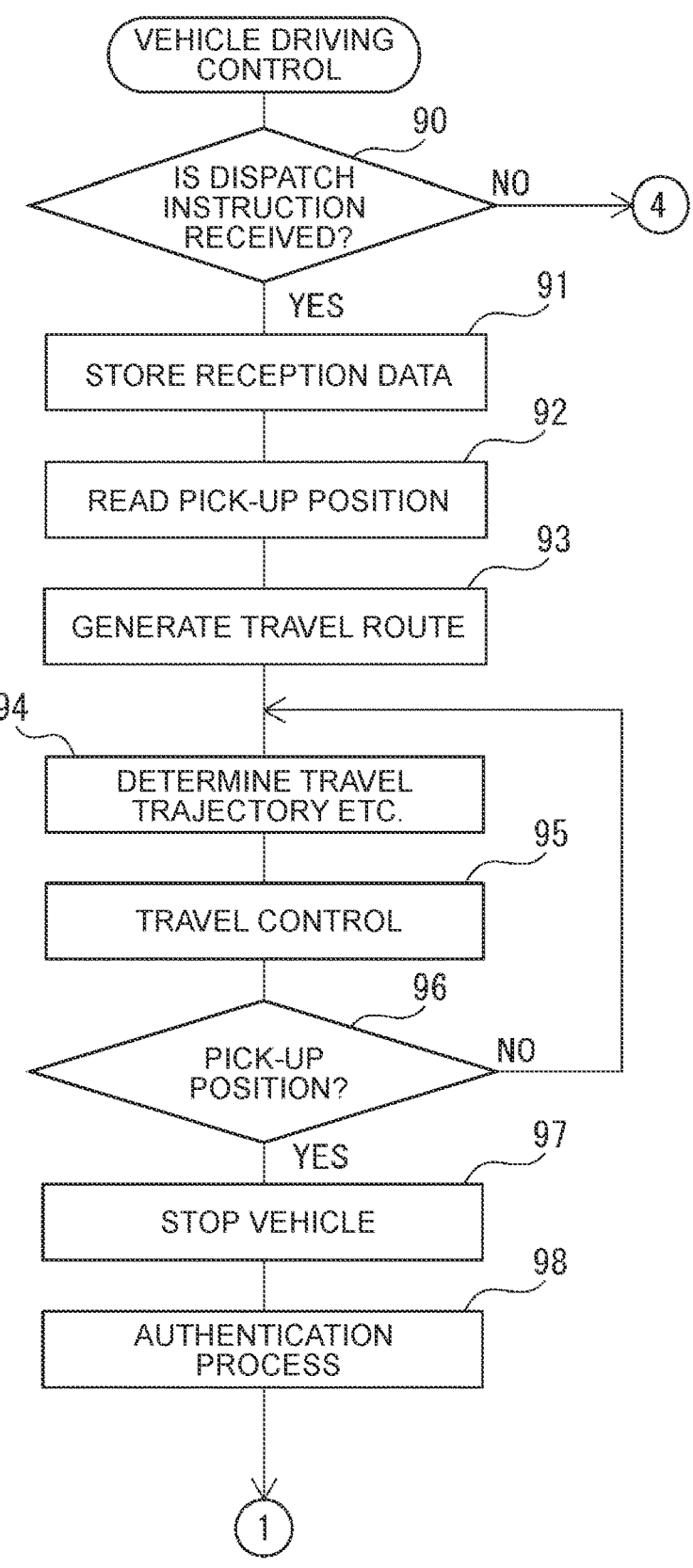
FIG. 15 is a flowchart for driving control on the autonomous taxi.
Figure 16:
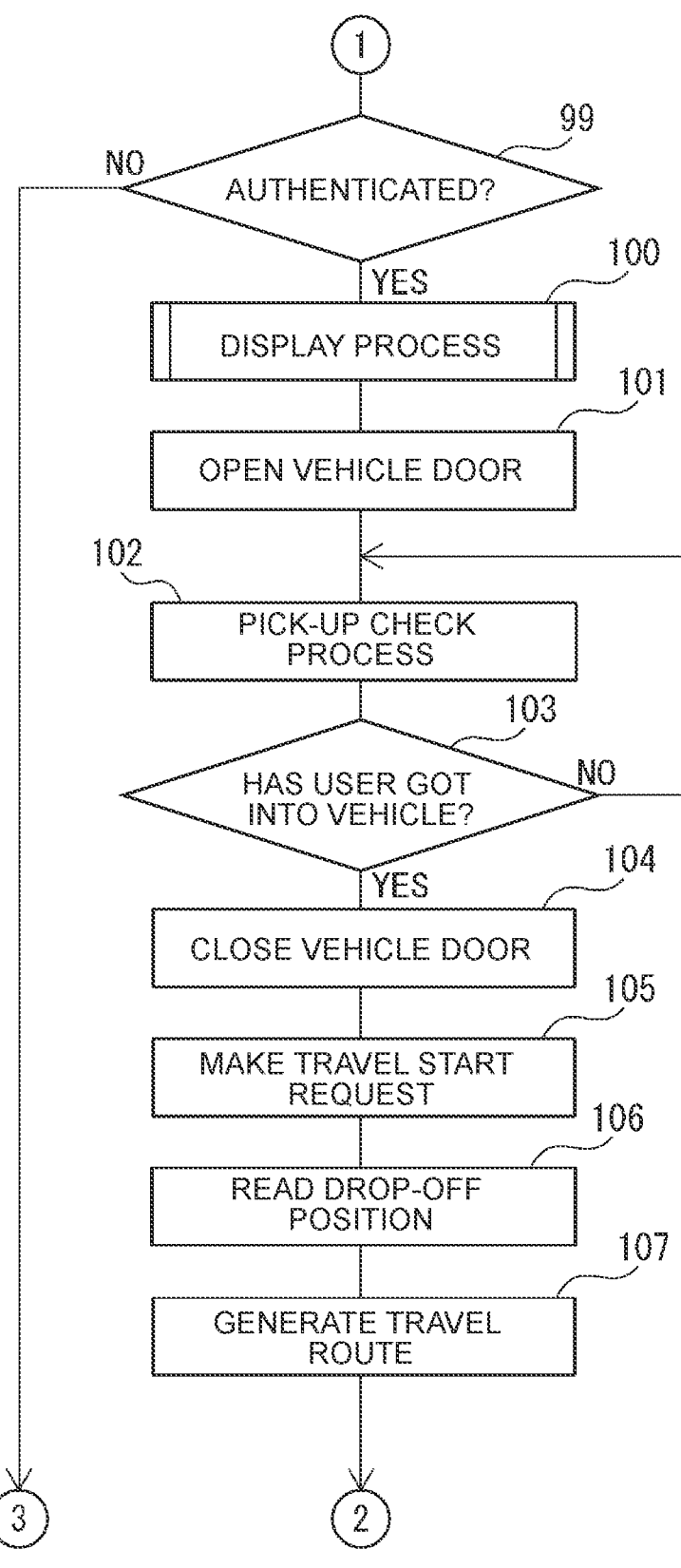
FIG. 16 is a flowchart for the driving control on the autonomous taxi.
Figure 17:
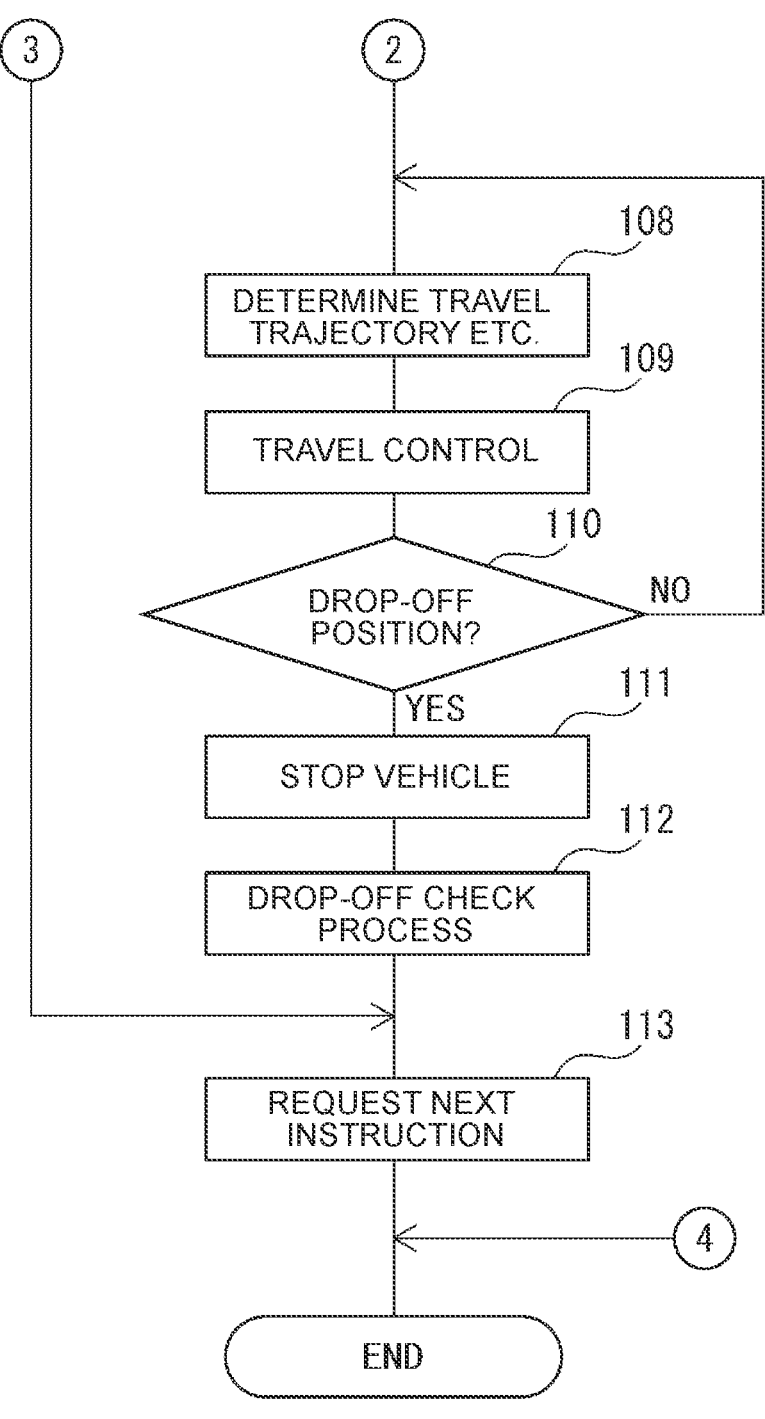
FIG. 17 is a flowchart for the driving control on the autonomous taxi.

FIG. 14 shows a dispatch management routine for execution of the process from S9 to S11 of FIG. 6. The dispatch management routine is repeatedly executed by the electronic control unit 15 of the dispatch management server 4.

Referring to FIG. 14, determination is first made in step 80 as to whether a dispatch request is received from the information processing server 3. When determination is made that the dispatch request is not received from the information processing server 3, the processing cycle is terminated. When determination is made that the dispatch request is received from the information processing server 3, the routine proceeds to step 81, and reception data including a user's desired movement route, information on a train expected for transfer on the user's desired movement route, a desired pick-up position, a desired pick-up time, and a desired drop-off position for the autonomous taxi 5, and a user ID is stored in the memory 18 of the electronic control unit 15.

In step 82, a search is made for autonomous taxis 5 that can be dispatched to the user's desired pick-up position at the user's desired pick-up time from among the autonomous taxis 5 located near the user's desired pick-up position. In this case, the search may be made for currently available autonomous taxis 5, and autonomous taxis 5 scheduled to become available around the user's desired pick-up time based on reservation information. In step 83, an autonomous taxi 5 to be dispatched is selected from among the autonomous taxis 5 in the search results. When the autonomous taxi 5 to be dispatched is selected, a dispatch instruction is transmitted from the dispatch management server 4 to the autonomous taxi 5 selected for dispatch in step 84 together with the user's desired movement route, the information on the train expected for transfer on the user's desired movement route, the desired dispatch details including the pick-up position, the drop-off position, and the pick-up time for the autonomous taxi 5, and the user ID. In step 85, information indicating that the dispatch has been completed is transmitted to the terminal 6.

FIGS. 15 to 18 show an autonomous taxi driving control routine for execution of the process from S12 to S19 of FIG. 6 and the subsequent process. This routine is repeatedly executed by the electronic control unit 23 of the autonomous taxi 5 selected for dispatch.

Referring to FIGS. 15 to 18, determination is first made in step 90 as to whether a dispatch instruction is received from the dispatch management server 4. When determination is made that the dispatch instruction is not received from the dispatch management server 4, the processing cycle is terminated. When determination is made that the dispatch instruction is received from the dispatch management server 4, the routine proceeds to step 91, and reception data including a user's desired movement route, information on a train expected for transfer on the user's desired movement route, a desired pick-up position, a desired pick-up time, and a desired drop-off position for the autonomous taxi 5, and a user ID is stored in the memory 26 of the electronic control unit 23.

In step 92, the user's desired pick-up position is read from the memory 26. In step 93, the navigation device 31 generates a travel route of the autonomous taxi 5 from the current position to the user's desired pick-up position based on the current position of the autonomous taxi 5 acquired by the GNSS receiver 29 and the user's desired pick-up position read from the memory 26. In step 94, a travel trajectory and a travel speed of the autonomous taxi 5 on and at which it does not come into contact with other vehicles or pedestrians are determined based on detection results from the sensors such as the cameras that capture a forward image etc. from the autonomous taxi 5, the LIDAR sensor, and the radar. In step 95, travel control on the autonomous taxi 5 is performed based on the determined travel trajectory and the determined travel speed.

In step 96, determination is made as to whether the autonomous taxi 5 has arrived at the user's desired pick-up position. When determination is made that the autonomous taxi 5 has not arrived at the user's desired pick-up position, the routine returns to step 94, and the autonomous driving of the autonomous taxi 5 is continued. When determination is made in step 96 that the autonomous taxi 5 has arrived at the user's desired pick-up position, the routine proceeds to step 97, and the autonomous taxi 5 is stopped. In step 98, the user authentication process is performed by short-range communication between the terminal 6 of the user who has made a dispatch reservation and the autonomous taxi 5. The authentication process is performed, for example, by checking the user ID stored in the memory 26 of the autonomous taxi 5 in response to the dispatch request against the user ID stored in the terminal 6 of the user who has made the dispatch request. When the user IDs agree with each other, the user who carries the terminal 6 is authenticated as the user who has made the dispatch request. Various authentication processes such as face authentication are known as user authentication processes. These known authentication processes can be used as the authentication process in step 98.

In step 99, determination is made as to whether the user who carries the terminal 6 is authenticated as the user who has made the dispatch request in the authentication possess in step 98. When the user who carries the terminal 6 is not authenticated as the user who has made the dispatch request in the authentication possess, the routine jumps to step 113, and the dispatch management server 4 is requested for an instruction on the next action. At this time, the autonomous taxi 5 is moved by autonomous driving, for example, toward a desired pick-up position of another user who has made a dispatch request. When the user who carries the terminal 6 is authenticated as the user who has made the dispatch request in the authentication possess, the routine proceeds to step 100, and the display process in S16 of FIG. 6 is performed. The display process is shown in FIG. 18.

Figure 18:
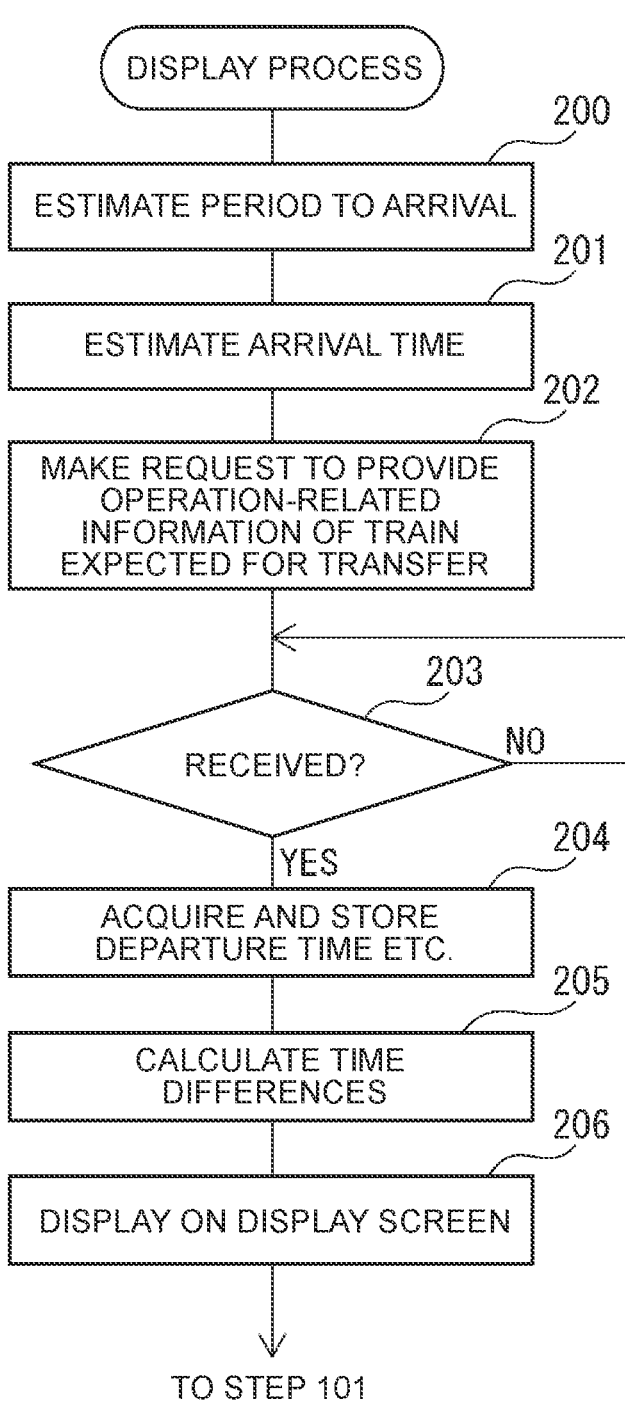
FIG. 18 is a flowchart for a display process.

Referring to FIG. 18, a period required until the autonomous taxi 5 arrives at the user's desired drop-off position is estimated in step 200 based on the user's desired drop-off position and traffic information received by the autonomous taxi 5 from a traffic information center. In step 201, an arrival time when the autonomous taxi 5 arrives at the user's desired drop-off position is estimated based on a current time and the period estimated in step 200 and required until the autonomous taxi 5 arrives at the user's desired drop-off position. In step 202, a request to provide operation-related information of the train expected for transfer is made from the autonomous taxi 5 to the information processing server 3.

When the request to provide the operation-related information of the train expected for transfer is made, the information processing server 3 searches for current operation information and current delay information of the train expected for transfer (step 70 in part C of FIG. 13), and then results of the search for the current operation information and the current delay information of the train expected for transfer are transmitted from the information processing server 3 to the autonomous taxi 5 (step 71 in part C of FIG. 13). In step 203, there is a wait until the results of the search for the operation-related information of the train expected for transfer are received. When the results of the search for the operation-related information of the train expected for transfer are received, the routine proceeds to step 204, and a current departure time and a current delay period of the train expected for transfer are acquired and stored in the memory 26 of the electronic control unit 23 of the autonomous taxi 5. In step 205, a time difference between the current time and the current departure time of the train expected for transfer, that is, the remaining period to the departure time and a time difference Δt between the estimated arrival time of the autonomous taxi 5 at the user's desired drop-off position and the departure time of the train expected to ride are calculated.

In step 206, the operation-related information of the train expected for transfer is displayed on the display screen 57 of the display device 32 disposed in the autonomous taxi 5. In the example shown in FIG. 9, a date and a current time, a destination on a vehicle travel route and an expected arrival time of the vehicle, operation information of the train expected for transfer (departure time, type such as "local", "express", or "limited express", and destination), the remaining period to the departure time (Remaining period: AA minutes), and the time difference Δt between the expected arrival time of the vehicle and the departure time of the train (After arrival: BB minutes) are displayed. Then, the routine proceeds to step 101 of FIG. 16. In step 101 of FIG. 16, the door of the autonomous taxi 5 is opened. When the door of the autonomous taxi 5 is opened, the user who has made the dispatch request gets into the autonomous taxi 5 alone, or some people including the user who has made the dispatch request get into the autonomous taxi 5.

In step 102, a pick-up check process is performed to check whether the user who has made the dispatch request or some people including the user who has made the dispatch request has/have got into the autonomous taxi 5. The pick-up check process is performed by the pick-up check device disposed in the autonomous taxi 5, for example, by analyzing an image captured by a pick-up check camera that captures an image of the vehicle cabin. In step 103, determination is made as to whether the user who has made the dispatch request or some people including the user who has made the dispatch request has/have got into the autonomous taxi 5. When determination is made that the user or some people including the user has/have not got into the autonomous taxi 5, the routine returns to step 102, and the pick-up check process is continued to check whether the user or some people including the user has/have got into the autonomous taxi 5. When determination is made in step 102 that the user or some people including the user has/have got into the autonomous taxi 5, the routine proceeds to step 104.

In step 104, the door of the autonomous taxi 5 is closed. When the door of the autonomous taxi 5 is closed, the routine proceeds to step 105, and a travel start request for the autonomous taxi 5 is made. The travel start request for the autonomous taxi 5 is made, for example, when the user who has got into the taxi touches a travel start button displayed on the display screen 57 of the display device 32 in the autonomous taxi 5. When the travel start request for the autonomous taxi 5 is made, the routine proceeds to step 106, and the user's desired drop-off position is read from the memory 26. In step 107, the navigation device 31 generates a travel route of the autonomous taxi 5 from the current position to the user's desired drop-off position based on the current position of the autonomous taxi 5 acquired by the GNSS receiver 29 and the user's desired drop-off position read from the memory 26.

In step 108, a travel trajectory and a travel speed of the autonomous taxi 5 on and at which it does not come into contact with other vehicles or pedestrians are determined based on detection results from the sensors such as the cameras that capture a forward image etc. from the autonomous taxi 5, the LIDAR sensor, and the radar. In step 109, travel control on the autonomous taxi 5 is performed based on the determined travel trajectory and the determined travel speed. In step 110, determination is made as to whether the autonomous taxi 5 has arrived at the user's desired drop-off position. When determination is made that the autonomous taxi 5 has not arrived at the user's desired drop-off position, the routine returns to step 108, and the autonomous driving of the autonomous taxi 5 is continued. When determination is made in step 110 that the autonomous taxi 5 has arrived at the user's desired drop-off position, the routine proceeds to step 111, and the autonomous taxi 5 is stopped.

In step 112, a drop-off check process is performed to check whether the user riding in the autonomous taxi 5 or some people including the user has/have got out of the autonomous taxi 5. The drop-off check process is performed by a drop-off check device disposed in the autonomous taxi 5, for example, by analyzing an image captured by a drop-off check camera that captures an image of the vehicle cabin. In step 113, the dispatch management server 4 is requested for an instruction on the next action.

Figure 19:
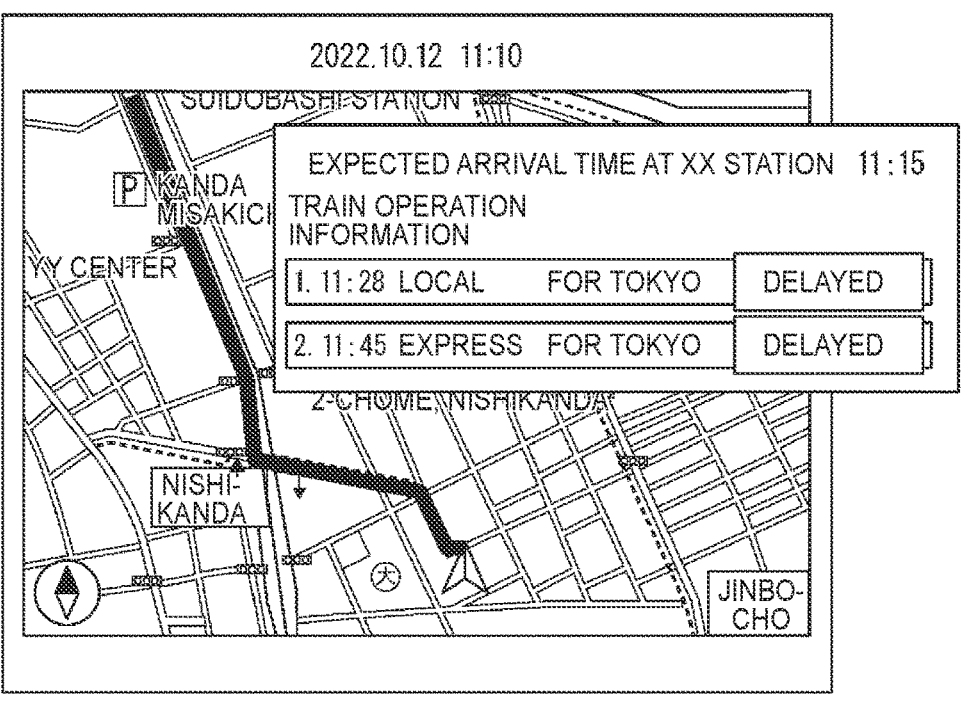
FIG. 19 is a diagram showing another example of the display contents displayed on the display screen.

FIG. 19 shows another example of the operation-related information of the train expected for transfer that is displayed on the display screen 57 of the display device 32 disposed in the autonomous taxi 5 in step 206 of FIG. 18. In this example, when the train expected for transfer is delayed, the display screen 57 of the display device 32 displays a word "delayed" for the delayed train in a format emphasized compared to the other words, for example, in bolder letters than those of the other words or in a color different from those of the other words.

In order that the passenger of the autonomous taxi 5 can easily notice that the train expected for transfer is delayed, at least one process is performed among a sound generation process for generating a sound, a seatbelt vibration process for vibrating a seatbelt, an illumination turn-on process for turning on an illumination, and an odor generation process for generating an odor.

Figure 20:
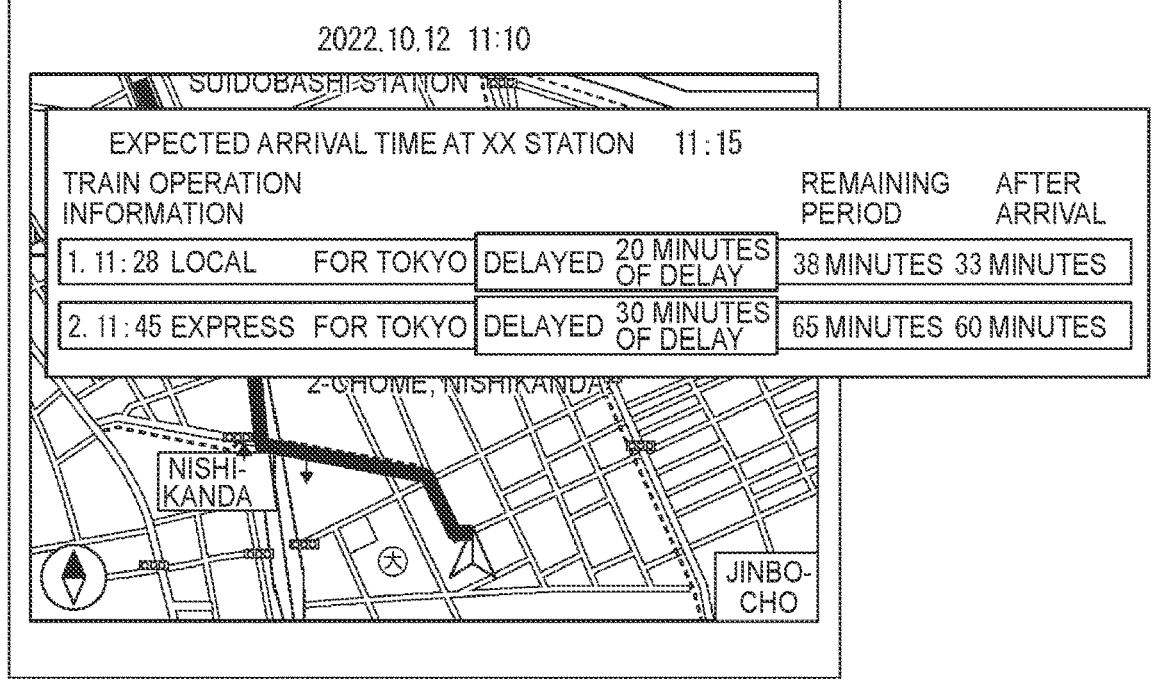
FIG. 20 is a diagram showing still another example of the display contents displayed on the display screen.

FIG. 20 shows still another example of the operation-related information of the train expected for transfer that is displayed on the display screen 57 of the display device 32 disposed in the autonomous taxi 5 in step 206 of FIG. 18. In this example, when the train expected for transfer is delayed, the display screen 57 of the display device 32 displays a word "delayed" for the delayed train in a format emphasized compared to the other words, and displays a delay period ("20 minutes of delay" or "30 minutes of delay"). The delay period is provided from a railroad operator to the information processing server 3 and then from the information processing server 3 to the autonomous taxi 5. In the example shown in FIG. 20, the display screen 57 of the display device 32 displays the remaining period to the departure time (Remaining period: AA minutes) and the time difference $\Delta t$ between the expected arrival time of the vehicle and the departure time of the train (After arrival: BB minutes).

Figure 21:
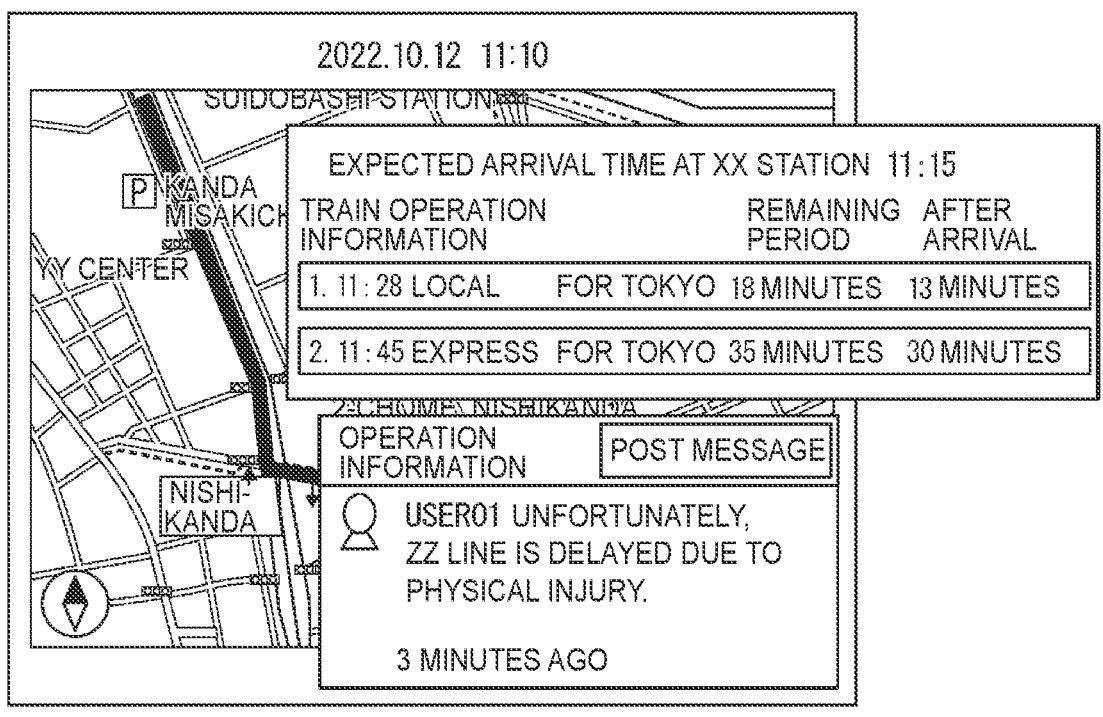
FIG. 21 is a diagram showing still another example of display contents displayed on the display screen.

FIG. 21 shows still another example of the operation-related information of the train expected for transfer that is displayed on the display screen 57 of the display device 32 disposed in the autonomous taxi 5 in step 206 of FIG. 18. In this example, when the train expected for transfer is delayed, the display screen 57 of the display device 32 displays, in addition to the train operation information shown in FIG. 9, delay information obtained by searching a social networking service (SNS), such as a posted message about the delay on the SNS. For example, the information processing server 3 searches an SNS search site for the posted message by using a "line name" of the train expected for transfer and "delay" as keywords, and the posted message in the search results is provided from the information processing server 3 to the autonomous taxi 5. The display screen 57 of the display device 32 displays only a message posted within the past few minutes.

In the embodiment described above, the display process for displaying the operation-related information on the display screen 57 of the display device 32 is performed after the authentication process for the passenger getting into the autonomous taxi 5. In this case, the display process for displaying the operation-related information on the display screen 57 of the display device 32 may be performed after the travel start request for the autonomous taxi 5 is made by the passenger who has got into the autonomous taxi 5.

As described above, according to the embodiment of the present disclosure, an information processing device mounted on a vehicle includes a movement route receiving unit configured to receive, from an outside, a movement route of a passenger of the vehicle that involves transfer from the vehicle to a scheduled transportation system, an operation-related information acquiring unit configured to acquire operation-related information of the scheduled transportation system to which the passenger is expected to transfer, and a display control unit configured to display the operation-related information on a display screen disposed in a cabin of the vehicle.

The embodiment of the present disclosure provides an information processing method to be performed in a vehicle. The information processing method includes receiving, from an outside, a movement route of a passenger of the vehicle that involves transfer from the vehicle to a scheduled transportation system, acquiring operation-related information of the scheduled transportation system to which the passenger is expected to transfer, and displaying the operation-related information on a display screen disposed in a cabin of the vehicle.

The embodiment of the present disclosure provides a program to be executed in a vehicle. The program causes a computer to perform functions including receiving, from an outside, a movement route of a passenger of the vehicle that involves transfer from the vehicle to a scheduled transportation system, acquiring operation-related information of the scheduled transportation system to which the passenger is expected to transfer, and displaying the operation-related information on a display screen disposed in a cabin of the vehicle.

In the embodiment of the present disclosure, the operation-related information of the scheduled transportation system to which the passenger is expected to transfer includes a departure time of the scheduled transportation system to which the passenger is expected to transfer. In the embodiment of the present disclosure, the operation-related information includes a time difference between a current time and a departure time of the scheduled transportation system to which the passenger is expected to transfer. Further, the operation-related information includes a time difference between an expected arrival time at a transfer place and a departure time of the scheduled transportation system to which the passenger is expected to transfer.

In the embodiment of the present disclosure, an authentication process for the passenger is performed when the passenger gets into the vehicle, and the display control unit is configured to, after the authentication process is performed, display the operation-related information of the scheduled transportation system to which the passenger is expected to transfer on a display screen of a display device disposed in the cabin of the vehicle. In another embodiment of the present disclosure, the display control unit is configured to, after a travel start request for the vehicle is made by the passenger who has got into the vehicle, display the operation-related information of the scheduled transportation system to which the passenger is expected to transfer on a display screen of a display device disposed in the cabin of the vehicle.

In the embodiment of the present disclosure, the operation-related information of the scheduled transportation system to which the passenger is expected to transfer includes delay information of the scheduled transportation system to which the passenger is expected to transfer. In this case, the display control unit is configured to display the delay information on a display screen of a display device disposed in the cabin of the vehicle in a format emphasized compared to other operation-related information except the delay information. In this case, in addition to display of the delay information on the display screen, at least one process is performed among a sound generation process for generating a sound, a seatbelt vibration process for vibrating a seatbelt, an illumination turn-on process for turning on an illumination, and an odor generation process for generating an odor. In the embodiment of the present disclosure, the operation-related information of the scheduled transportation system to which the passenger is expected to transfer includes delay information obtained by searching an SNS.

What is claimed is:

1. An information processing device mounted on a vehicle, the information processing device comprising:
a movement route receiving unit configured to receive, from an outside, a movement route of a passenger of the vehicle that involves transfer from the vehicle to a scheduled transportation system;
an operation-related information acquiring unit configured to acquire operation-related information of the scheduled transportation system to which the passenger is expected to transfer; and

18 a display control unit configured to display the operation-related information on a display screen disposed in a cabin of the vehicle;
wherein the display control unit is configured to, after a travel start request for the vehicle is made by the passenger who has got into the vehicle, display the operation-related information on a display screen of a display device disposed in the cabin of the vehicle.

2. The information processing device according to claim 1, wherein the operation -related information includes a departure time of the scheduled transportation system to which the passenger is expected to transfer.

3. The information processing device according to claim 1, wherein the operation -related information includes a time difference between a current time and a departure time of the scheduled transportation system to which the passenger is expected to transfer.

4. The information processing device according to claim 1, wherein the operation -related information includes a time difference between an expected arrival time at a transfer place and a departure time of the scheduled transportation system to which the passenger is expected to transfer.

5. The information processing device according to claim 1, wherein an authentication process for the passenger is performed when the passenger gets into the vehicle, and the display control unit is configured to, after the authentication process is performed, display the operation-related information on a display screen of a display device disposed in the cabin of the vehicle.

6. The information processing device according to claim 1, wherein the operation -related information includes delay information of the scheduled transportation system to which the passenger is expected to transfer.

7. An information processing device mounted on a vehicle, the information processing device comprising:
a movement route receiving unit configured to receive, from an outside, a movement route of a passenger of the vehicle that involves transfer from the vehicle to a scheduled transportation system;
an operation-related information acquiring unit configured to acquire operation-related information of the scheduled transportation system to which the passenger is expected to transfer; and
a display control unit configured to display the operation-related information on a display screen disposed in a cabin of the vehicle;
wherein the operation-related information includes delay information of the scheduled transportation system to which the passenger is expected to transfer; and
wherein the display control unit is configured to display the delay information on a display screen of a display device disposed in the cabin of the vehicle in a format emphasized compared to other operation-related information except the delay information.

8. The information processing device according to claim 7, wherein the display control unit is configured to, in addition to display of the delay information on the display screen, perform at least one process among a sound generation process for generating a sound, a seatbelt vibration process for vibrating a seatbelt, an illumination turn-on process for turning on an illumination, and an odor generation process for generating an odor.

9. An information processing device mounted on a vehicle, the information processing device comprising:
a movement route receiving unit configured to receive, from an outside, a movement route of a passenger of the vehicle that involves transfer from the vehicle to a scheduled transportation system;

an operation-related information acquiring unit configured to acquire operation-related information of the scheduled transportation system to which the passenger is expected to transfer; and a display control unit configured to display the operation-related information on a display screen disposed in a cabin of the vehicle:

wherein the operation-related information includes delay information of the scheduled transportation system to which the passenger is expected to transfer; and wherein the operation-related information includes delay information obtained by searching a social networking service.

10. The information processing device according to claim 5 further comprising a authentication unit configured to perform the authentication process that identify a passenger as a user who has made a dispatch reservation, when the passenger gets into the vehicle.

* * * * *